US012692828B2

(12) United States Patent
Horikoshi et al.

(10) Patent No.: US 12,692,828 B2
(45) Date of Patent: Jul. 28, 2026

(54) FUEL REFORMING SYSTEM

(71) Applicant: Mazda Motor Corporation, Hiroshima (JP)

(72) Inventors: Masahiro Horikoshi, Aki-gun (JP); Yuji Harada, Aki-gun (JP); Kenji Uchida, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 19/050,167

(22) Filed: Feb. 11, 2025

(65) Prior Publication Data

US 2025/0264076 A1 Aug. 21, 2025

(30) Foreign Application Priority Data

Feb. 15, 2024 (JP) ................................ 2024-021479

(51) Int. Cl.
*F02M 21/02* (2006.01)
*F02B 75/02* (2006.01)
*F02M 27/02* (2006.01)

(52) U.S. Cl.
CPC ....... *F02M 21/0287* (2013.01); *F02B 75/021* (2013.01); *F02M 21/0209* (2013.01); *F02M 27/02* (2013.01)

(58) Field of Classification Search
CPC ........... F02M 21/0239; F02M 21/0209; F02M 21/06; F02B 75/021
See application file for complete search history.

(56) References Cited

U.S. PATENT DOCUMENTS 7,448,348 B2 * 11/2008 Shinagawa ............... C01B 3/26 123/3
2008/0202449 A1 * 8/2008 Shimada ............. F02D 13/0276 123/3
2023/0406701 A1 12/2023 Kiyosawa et al.

FOREIGN PATENT DOCUMENTS

EP 2472079 A1 * 7/2012 ......... F02D 19/0644
JP 2022-104521 A 7/2022

* cited by examiner

*Primary Examiner* — Kevin A Lathers
(74) *Attorney, Agent, or Firm* — XSENSUS LLP

(57) ABSTRACT

A fuel reforming system for a vehicle on which a reciprocating engine is mounted is provided can comprise a decomposer to decompose hydrocarbon fuel into carbon and hydrogen gas by using heat and a pressure of combustion gas and a catalyst and to hold carbon. The decomposer can communicate with a combustion chamber via an openable/closable third port. A reforming space in which a reforming member including the catalyst is installed can be on the side of a connection portion of the decomposer with the third port. On an opposite side of interior of the connection portion of the decomposer with the third port, an additional space is provided to accommodate residual gas that remains in the third port and the decomposer when combustion gas is introduced into the decomposer through the third port.

20 Claims, 13 Drawing Sheets

<COMPARATIVE EXAMPLE>

<EXAMPLE>

FUEL REFORMING SYSTEM

CROSS-REFERENCE TO RELATED APPLICATION

This application claims priority to Japanese Patent Application No. 2024-021479 filed on Feb. 15, 2024, the entire disclosure of which is incorporated by reference herein.

TECHNICAL FIELD

The disclosed technique relates to a fuel reforming system for a vehicle on which a reciprocating engine is mounted.

BACKGROUND ART

A device (decomposition device) for directly decomposing a hydrocarbon into carbon and hydrogen is described in Patent Literature 1. This decomposition device includes a reactor in which a catalyst is accommodated. When raw material gas containing hydrocarbons is supplied to the reactor, carbon produced by the reaction of the catalyst adheres to the catalyst. Reaction gas containing hydrogen flows through the reactor.

CITATION LIST

Patent Literature

[Patent Literature 1] JP2022-104521A

SUMMARY

According to one or more aspects, a fuel reforming system for a vehicle, on which a reciprocating engine is mounted, and in the reciprocating engine, a combustion chamber where combustion occurs is partitioned in a cylinder in which a piston reciprocates, can be provided or implemented.

The fuel reforming system can include: a decomposer that decomposes hydrocarbon fuel into carbon and hydrogen gas by using heat and a pressure of combustion gas produced in the combustion chamber and a catalyst and holds the carbon; and a hydrocarbon fuel supply section that supplies the hydrocarbon fuel to the decomposer.

The decomposer can communicate with the combustion chamber via an openable/closable port. A reforming space in which a reforming member including the catalyst is installed can be provided on a side of a connection portion of the decomposer with the port. On an opposite side of interior of the connection portion of the decomposer with the port, an additional space can be provided adjacent to the reforming space, in the additional space, residual gas that remains in the port and the decomposer being accommodated when the combustion gas is introduced into the decomposer through the port.

DETAILED DESCRIPTION OF EMBODIMENTS

Figure 1:
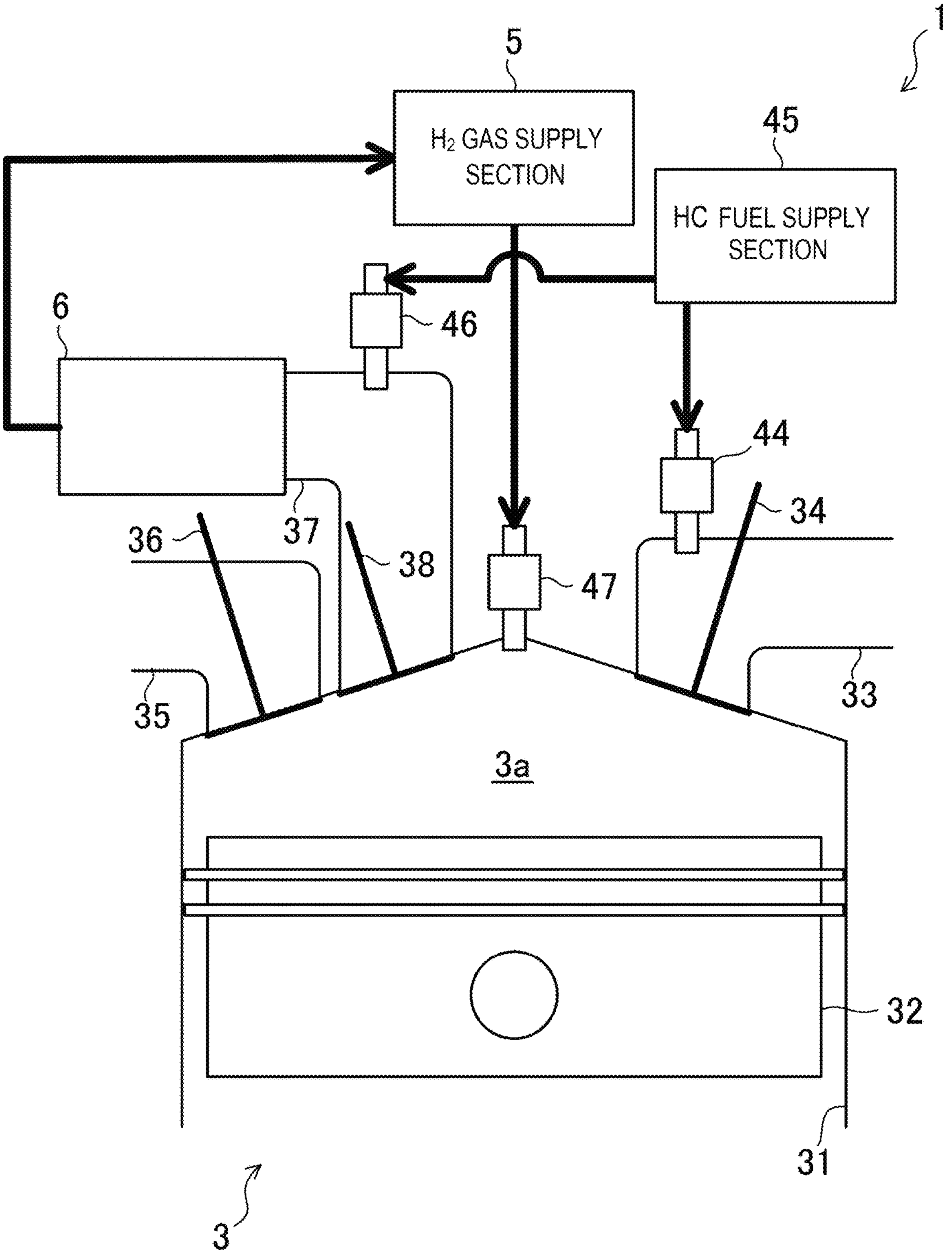
FIG. 1 is a schematic view of a fuel reforming system according to one or more embodiments of the present disclosure.

In the technical field of vehicles (for example, four-wheeled vehicles), there is a demand for an approach to being carbon neutral. In order to make a vehicle, on which an engine using hydrocarbon (HC) fuel (including gasoline and/or light oil), carbon neutral, there may be a need or desire for a technique of collecting carbon (C) or carbon dioxide (CO2) from the hydrocarbon fuel, in addition to improvement in thermal efficiency of the engine and/or improvement in exhaust emission performance.

In the vehicle, on which the engine using the hydrocarbon fuel is mounted, in order to collect carbon or carbon dioxide, it may be considered to:

(1) collect carbon dioxide after combustion of the hydrocarbon fuel; or (2) decompose the hydrocarbon fuel into carbon and hydrogen gas before combustion of the hydrocarbon fuel and collect carbon.

In consideration that collected carbon dioxide or carbon is stored in the vehicle, (2) may be viewed in terms of fuel economy performance of the vehicle due to a reason that carbon dioxide is heavier than carbon. In addition, in the case of (2), it may also be possible to use the hydrogen gas as the fuel for the engine. It is also noted that when the hydrogen gas is combusted, no carbon oxide may be produced due to the combustion.

Thus, it may be considered to mount the above-described decomposition device onto the vehicle. The decomposition device can include a heater for raising a temperature of the catalyst. Thus, when the decomposition device is mounted on the vehicle, heat of the combustion gas in the engine can be used to raise the temperature of the catalyst and raise a temperature of the hydrocarbon fuel.

However, in order to efficiently produce the hydrogen gas in the decomposition device, a reforming reaction can be promoted by bringing the heated hydrocarbon fuel into contact with the heated catalyst. Thus, it may be necessary or desirable to distribute the hydrocarbon fuel throughout the catalyst.

Meanwhile, when the decomposition device decomposes the hydrocarbon fuel into the hydrogen gas and carbon to take out the hydrogen gas from the decomposition device, gas containing impure gas such as nitrogen (residual gas) may remain in the decomposition device. This residual gas may prevent contact between the hydrocarbon fuel and the catalyst. Thus, the residual gas can disturb the reforming reaction.

The same can apply to carbon. When an amount of carbon inside the decomposition device is increased, carbon may disturb the reforming reaction. Thus, when the amount of carbon is increased, carbon may have to be removed from the decomposition device.

The technique disclosed herein can provide a fuel reforming system capable of efficiently producing hydrogen gas and suitable for mounting on a vehicle.

That is, in this fuel reforming system, the hydrocarbon fuel can be decomposed into carbon and the hydrogen gas by using a function of the reciprocating engine and using the heat and the pressure of the combustion gas produced in the combustion chamber and the catalyst. Thus, this fuel reforming system can facilitate the production of the hydrogen gas. This fuel reforming system can be suitable for mounting on the vehicle.

The produced hydrogen gas can be used as fuel for the reciprocating engine. Produced carbon can be held by the decomposer. Thus, the vehicle can become carbon neutral.

In the decomposer according to one or more embodiments of the present disclosure, the reforming space in which the reforming member including the catalyst is installed can be provided on an introduction side of the combustion gas. That is, a reforming reaction for producing the hydrogen gas can take place in the reforming space. In the interior of the decomposer on the opposite side, the additional space can be provided adjacent to the reforming space to accommodate the residual gas, which can remain in the port and the decomposer, when the combustion gas is introduced into the decomposer.

When the combustion gas is introduced into the decomposer through the port, the residual gas remaining therein can be pushed into the back of the decomposer. A mass of the residual gas can be formed in the back of the decomposer. The residual gas can have a lower temperature than the combustion gas and may not or does not contain the hydrocarbon fuel. Meanwhile, the residual gas can contain a relatively large amount of inert gas. That is, the reforming reaction may not occur in the portion where the mass of the residual gas is present.

Meanwhile, in this fuel reforming system, the mass of the residual gas can be accommodated in the additional space. As a result, the high-temperature, high-pressure combustion gas can be spread over the reforming space without excess or deficiency. The hydrogen gas can be efficiently produced without wasting the hydrocarbon fuel.

The fuel reforming system can further include a variable volume mechanism for varying a volume of the additional space. The volume of the additional space may be varied according to an operating state of the reciprocating engine.

In general, as the load of the reciprocating engine is increased, required combustion energy is increased. Thus, the pressure (temperature) of the combustion gas is increased as the load of the reciprocating engine is increased. Accordingly, a difference (differential pressure) between a pressure of the residual gas remaining in the port and the decomposer and the pressure of the combustion gas introduced from the combustion chamber into the decomposer can be relatively large when the load of the reciprocating engine is large, and can be relatively small when the load of the reciprocating engine is small.

When the differential pressure is relatively small, the mass of the residual gas can be increased. Meanwhile, when the differential pressure is relatively large, the residual gas can be further compressed. Thus, the mass of the residual gas can be reduced. Accordingly, when the load of the reciprocating engine is changed, an optimum volume of the additional space can also be changed.

Meanwhile, in this fuel reforming system according to one or more embodiments of the present disclosure, the volume of the additional space can be configured to be varied according to an operating state of the reciprocating engine. Thus, the volume of the additional space can be changed, and the volume of the additional space can be maintained in an optimum state.

The fuel reforming system may be configured such that the carbon can be held in a separable state in the decomposer and an openable/closable discharge passage can be connected to the additional space and that the carbon separated from the decomposer can be discharged through the discharge passage.

Carbon produced in the reforming reaction can adhere to the catalyst. Thus, as the carbon deposition amount is increased, decomposition performance of the decomposer may deteriorate. At least for this reason, in order to maintain the decomposition performance of the decomposer, carbon may have to be removed from the decomposer when being deposited to some extent.

Meanwhile, in this fuel reforming system according to one or more embodiments of the present disclosure, the discharge passage can be connected to the additional space, and carbon separated from the decomposer can be configured to be discharged through the discharge passage. Thus, when necessary, carbon stored in the decomposer can be removed automatically. A yield of the hydrogen gas can be recovered, and decomposition capacity of the decomposer can be maintained.

In the fuel reforming system according to one or more embodiments of the present disclosure, the reciprocating engine may be configured to perform a six-stroke cycle including: an intake stroke in which at least intake air is introduced into the combustion chamber through an intake port by lowering the piston; a compression stroke in which air-fuel mixture containing the hydrogen gas supplied to the combustion chamber is compressed by raising the piston; an expansion stroke in which the piston is lowered by combustion of the air-fuel mixture; a recompression stroke in which the combustion gas is compressed by raising the piston; a re-expansion stroke in which the piston is lowered; and an exhaust stroke in which exhaust gas is discharged through an exhaust port by raising the piston. In the recompression stroke, the combustion gas may be introduced into the decomposer through the port, and the residual gas may be thereby pushed and accommodated in the additional space.

In the recompression stroke, the combustion gas in the combustion chamber can be pressurized by raising the piston. Since the gas can be introduced into the decomposer, an internal pressure of the decomposer can also be increased. Accordingly, the residual gas can be compressed, and a volume thereof can be reduced. Thus, an optimum volume of the additional space can be reduced. The decomposer can be compact in size, according to one or more embodiments of the present disclosure.

According to the disclosed technique, it can be possible to efficiently generate the hydrogen gas by using the functions of the reciprocating engine. Therefore, it can be possible to obtain the fuel reforming system suitable for mounting on the vehicle.

Hereinafter, the disclosed technique will be described. However, the following description is merely illustrative in nature.

(Configuration of Fuel Reforming System)

FIG. 1 illustrates a fuel reforming system 1 mounted on a vehicle. Hydrocarbon fuel is stored in a fuel tank that is mounted on the vehicle. The hydrocarbon fuel is gasoline, for example. The hydrocarbon fuel is not limited to gasoline. The fuel reforming system 1 decomposes the hydrocarbon fuel into carbon and hydrogen gas. Carbon is stored in a decomposer 6 described below. The hydrogen gas is used as fuel for a reciprocating engine 3. The fuel reforming system 1 makes the vehicle, on which the hydrocarbon fuel is mounted, carbon neutral.

The fuel reforming system 1 includes the reciprocating engine 3 (hereinafter, also simply referred to as the engine 3). The engine 3 includes a cylinder 31 and a piston 32 that reciprocates in the cylinder 31. In an upper end portion of the cylinder 31, a combustion chamber 3*a*, which is partitioned on a lower surface by the piston 32, is formed. The engine 3 includes the plural cylinders 31.

The plural cylinders 31 are arranged in a direction in which a crankshaft of the engine 3 extends, for example. The piston 32 in each of the cylinders 31 is connected to the crankshaft via a connecting rod. The connecting rod converts reciprocating motion of the piston 32 into rotation of the crankshaft. The crankshaft is connected to drive wheels via a transmission. The engine 3 outputs a driving force for travel of the vehicle.

The engine 3 has an intake port 33. The intake port 33 communicates with the upper portion of the cylinder 31, that is, the combustion chamber 3*a*. Each of the cylinders 31 has the one or more intake ports 33. Each of the cylinders 31 may have the two intake ports 33, for example. The intake port 33 is connected to an intake pipe. As will be described below, intake air is introduced into each of the combustion chambers 3*a* through the respective intake port 33. The intake air at least contains fresh air (outside air). The intake air may contain exhaust gas recirculation (EGR) gas.

The engine 3 includes an intake valve 34. The intake valve 34 is a poppet valve that opens/closes the intake port 33. When the intake valve 34 is opened, the intake air is introduced into the combustion chamber 3*a*. An intake valve train 41 illustrated in FIG. 2 opens/closes the intake valve 34. The intake valve train 41 includes an intake camshaft that is mechanically connected to the intake valve 34, for example.

The intake valve train 41 can continuously change valve timing of the intake valve 34 (so-called sequential-valve timing (S-VT)). The intake valve train 41 can also continuously change a valve lift of the intake valve 34 (so-called continuously variable valve lift (CVVL)). As the intake valve train 41, a known hydraulic or electric mechanism can be employed. The intake valve train 41 changes the valve timing and/or the valve lift according to an operating state of the engine 3.

The engine 3 has an exhaust port 35. The exhaust port 35 communicates with the combustion chamber 3*a*. Each of the cylinders 31 has the one or more exhaust ports 35. Each of the cylinders 31 may have the single exhaust port 35, for example. The exhaust port 35 is connected to an exhaust pipe. As will be described below, exhaust gas is discharged from the combustion chamber 3*a* through the exhaust port 35.

The engine 3 has an exhaust valve 36. The exhaust valve 36 is a poppet valve that opens/closes the exhaust port 35. When the exhaust valve 36 is opened, the exhaust gas is discharged to the outside of the cylinder 31. An exhaust valve train 42 illustrated in FIG. 2 opens/closes the exhaust valve 36. The exhaust valve train 42 has an exhaust camshaft that is mechanically connected to the exhaust valve 36, for example.

The exhaust valve train 42 can continuously change valve timing of the exhaust valve 36 (so-called S-VT). The exhaust valve train 42 can also continuously change a valve lift of the exhaust valve 36 (so-called CVVL). As the exhaust valve train 42, a known hydraulic or electric mechanism can be employed. The exhaust valve train 42 changes the valve timing and/or the valve lift according to the operating state of the engine 3.

The engine 3 has a third port 37. In this embodiment, the third port 37 corresponds to the "port" in the disclosed technique. The third port 37 communicates with the combustion chamber 3*a*. Each of the cylinders 31 has the at least one third port 37. Each of the cylinders 31 may have the single third port 37, for example.

The typical engine 3 has the two intake ports and the two exhaust ports for each of the cylinders 31. The engine 3 in FIG. 1 has the two intake ports 33, the single exhaust port 35, and the single third port 37 per cylinder 31. In order to facilitate understanding, in FIG. 1, the exhaust port 35 and the third port 37 are illustrated in an offset manner.

The engine 3 has an on-off valve 38. The on-off valve 38 is a poppet valve that opens/closes the third port 37. A third valve train 43 illustrated in FIG. 2 opens/closes the on-off valve 38. The third valve train 43 has a third camshaft that is mechanically connected to the on-off valve 38, for example. The third valve train 43 opens the on-off valve 38 twice during one cycle.

The third valve train 43 can stop opening/closing of the on-off valve 38. As a valve stopping mechanism for stopping opening/closing of the on-off valve 38, a known hydraulic or electric mechanism can be employed. The valve stopping mechanism may be incorporated into a rocker arm that is interposed between the third camshaft and the on-off valve 38, for example. Alternatively, the valve stopping mechanism may be incorporated into a lash adjuster that supports the rocker arm. The on-off valve 38 may be mechanically connected to the intake camshaft or the exhaust camshaft.

An intake port injector 44 is attached to the engine 3. An injection hole of the intake port injector 44 faces the inside of the intake port 33. The intake port injector 44 injects the hydrocarbon fuel as fuel into the intake port 33. A hydrocarbon fuel supply section 45 is connected to the intake port injector 44. The hydrocarbon fuel supply section 45 includes a fuel tank for storing the hydrocarbon fuel and a fuel pump for pumping the hydrocarbon fuel.

A third port injector 46 is attached to the engine 3. An injection hole of the third port injector 46 faces the inside of the third port 37. The third port injector 46 injects the hydrocarbon fuel as fuel to be reformed into the third port 37. The hydrocarbon fuel supply section 45 is also connected to the third port injector 46.

Accordingly, the hydrocarbon fuel supply section 45 supplies the hydrocarbon fuel to the intake port injector 44 and the third port injector 46.

A hydrogen injector 47 is attached to the engine 3. An injection hole of the hydrogen injector 47 faces the combustion chamber 3*a*. The hydrogen injector 47 injects the hydrogen gas into the combustion chamber 3*a*.

An injector for injecting the hydrocarbon fuel may be attached to the engine 3 in a manner to face the combustion chamber 3*a*, and the hydrogen injector for injecting the hydrogen gas may be attached to the engine 3 in a manner to face the inside of the intake port 33.

The decomposer 6 is connected to the third port 37. The decomposer 6 communicates with the combustion chamber 3*a* via the third port 37. The decomposer 6 decomposes the hydrocarbon fuel into carbon and the hydrogen gas. The decomposer 6 is attached to each of the cylinders 31. The decomposer 6 may be shared by the plural cylinders 31.

The decomposer 6 uses heat and a pressure of the combustion gas, which is produced in the combustion chamber 3*a*, and a catalyst to decompose the hydrocarbon fuel into carbon and the hydrogen gas. The decomposer 6 is a so-called membrane reactor that performs a reforming reaction. The decomposition of the hydrocarbon fuel such as isooctane is expressed by the following chemical reaction formula:

$$iC8H18(g)=8C(s)+9H2$$

Then, the produced hydrogen gas is taken out from the decomposer 6. Produced carbon is held inside the decomposer 6. Collection of carbon as a solid suppresses an increase in vehicle weight. The fuel reforming system 1 is suitable as an in-vehicle system. Details of the decomposer 6 will be described below.

The decomposer 6 is connected to a hydrogen gas supply section 5. The hydrogen gas produced in the decomposer 6 is delivered to the hydrogen gas supply section 5. The hydrogen gas supply section 5 includes: a gas tank that stores the hydrogen gas; an on-off valve that controls inflow and outflow of the hydrogen gas from the gas tank; and the like. The hydrogen gas supply section 5 is also connected to the hydrogen injector 47.

The hydrogen gas supply section 5 supplies the hydrogen gas to the hydrogen injector 47. This hydrogen gas is the hydrogen gas decomposed from the hydrocarbon fuel. That is, in this fuel reforming system 1, the hydrogen gas obtained by removing carbon from the hydrocarbon fuel is reused as the fuel.

(Controller)

Figure 2:
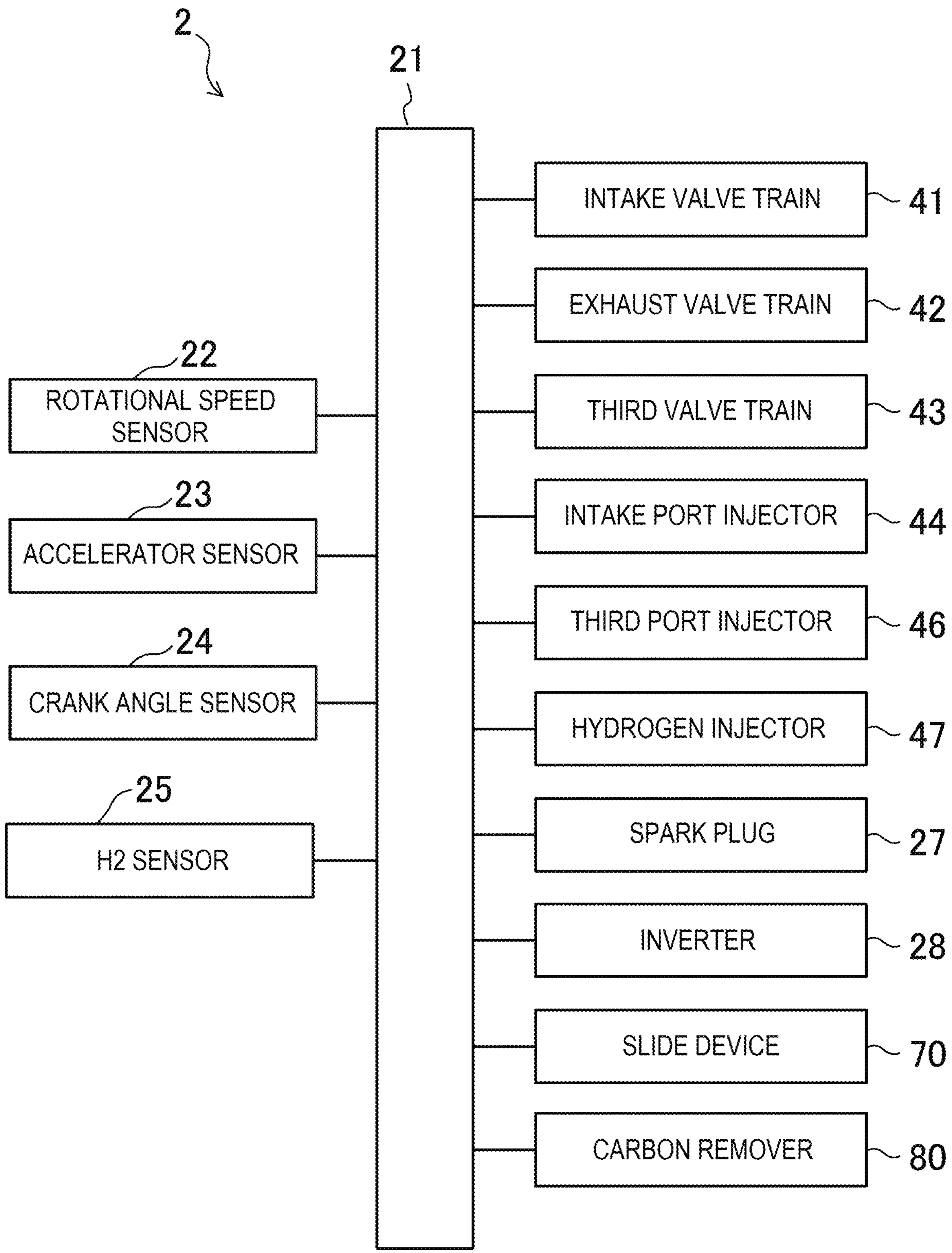
FIG. 2 is a block diagram of a control system according to one or more embodiments of the present disclosure.

FIG. 2 is a block diagram of a control system 2 mounted on the vehicle. The fuel reforming system 1 cooperates with this control system 2. The fuel reforming system 1 and the control system 2 share devices when necessary. The control system 2 includes a controller 21. The controller 21 includes: hardware such as a processor, memory, and an interface; and software such as a database and a control program.

A rotational speed sensor 22 is electrically connected to the controller 21. The rotational speed sensor 22 is attached to the engine 3. The rotational speed sensor 22 outputs a measurement signal corresponding to a rotational speed of the crankshaft to the controller 21. The controller 21 obtains a speed of the engine 3 based on the measurement signal of the rotational speed sensor 22.

An accelerator sensor 23 is electrically connected to the controller 21. The accelerator sensor 23 is attached to an accelerator pedal. The accelerator sensor 23 outputs a signal corresponding to a depression amount of the accelerator pedal to the controller 21. The controller 21 obtains a required load of the engine 3 based on the measurement signal from the accelerator sensor 23.

A crank angle sensor 24 is electrically connected to the controller 21. The crank angle sensor 24 is attached to the engine 3. The crank angle sensor 24 outputs a signal corresponding to an angle of the crankshaft to the controller 21. The controller 21 obtains a position of the piston 32 in each of the cylinders 31 based on the signal of the crank angle sensor 24.

A hydrogen gas sensor 25 is attached to the decomposer 6. The hydrogen gas sensor 25 measures an amount of the hydrogen gas produced in the decomposer 6. The controller 21 outputs a control signal to the hydrogen gas sensor 25. Based on the control signal from the controller 21, the hydrogen gas sensor 25 outputs a signal corresponding to the amount of the hydrogen gas (concentration of the hydrogen gas) to the controller 21. The controller 21 determines a degree of performance degradation of the decomposer 6 based on the signal from the hydrogen gas sensor 25.

The intake valve train 41, the exhaust valve train 42, and the third valve train 43 are electrically connected to the controller 21. The controller 21 outputs a control signal to each of the intake valve train 41, the exhaust valve train 42, and the third valve train 43 according to the operating state of the engine 3. The intake valve train 41 changes the valve timing and/or the valve lift of the intake valve 34 based on the control signal from the controller 21. The exhaust valve train 42 changes the valve timing and/or the valve lift of the exhaust valve 36 based on the control signal from the controller 21. The third valve train 43 also switches between opening/closing and stopping of the on-off valve 38 based on the control signal from the controller 21.

The above-described intake port injector 44, third port injector 46, and hydrogen injector 47 are each electrically connected to the controller 21. The controller 21 outputs a control signal to each of the intake port injector 44, the third port injector 46, and the hydrogen injector 47. The intake port injector 44 injects a predetermined amount of the hydrocarbon fuel into the intake port 33 at predetermined timing based on the control signal from the controller 21. The third port injector 46 injects a predetermined amount of the hydrocarbon fuel into the third port 37 at predetermined timing based on the control signal from the controller 21. The hydrogen injector 47 injects a predetermined amount of the hydrogen gas into the combustion chamber 3*a* at predetermined timing based on the control signal from the controller 21.

The control system 2 has a spark plug 27. The spark plug 27 is attached to the engine 3 in a manner to face the combustion chamber 3*a*. The spark plug 27 is electrically connected to the controller 21. The controller 21 outputs a control signal to the spark plug 27. The spark plug 27 ignites air-fuel mixture in the combustion chamber 3*a* at predetermined timing based on the control signal from the controller 21.

The control system 2 may include an inverter 28. In this case, the vehicle includes a drive motor (assist motor) that outputs the driving force for travel of the vehicle. The inverter 28 controls the drive motor thereof. The inverter 28 is electrically connected to the controller 21. The controller 21 outputs a control signal to the inverter 28 when output of the engine 3 is insufficient. As a result, the drive motor is actuated to assist with the operation of the engine 3.

The control system 2 may also include a slide device 70 (an example of a variable volume mechanism). In this case, the slide device 70 is electrically connected to the controller 21. The controller 21 outputs a control signal to the slide device 70. The slide device 70 moves a slider to be described below based on the control signal from the controller 21.

The control system 2 may also include a carbon remover 80. In this case, the carbon remover 80 is electrically connected to the controller 21. The controller 21 outputs a control signal to the carbon remover 80. In this way, the carbon remover 80 is actuated or stopped. The inverter 28, the slide device 70, and the carbon remover 80 are related to another embodiment of the fuel reforming system 1 described below. Thus, these will be described separately below.

(Operation of Reciprocating Engine)

Figure 3:
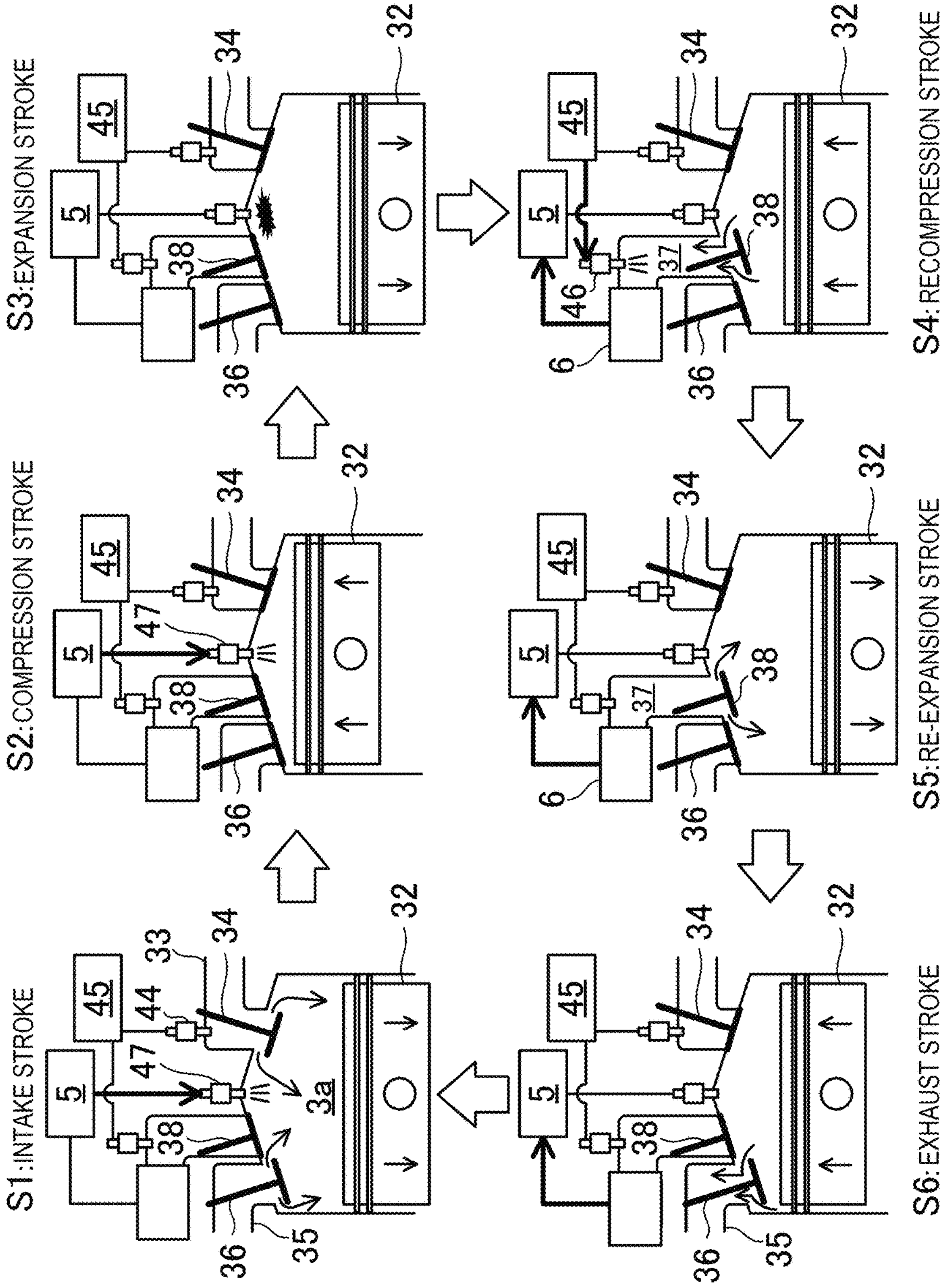
FIG. 3 is a view illustrating a six-stroke cycle according to one or more embodiments of the present disclosure.
Figure 4:
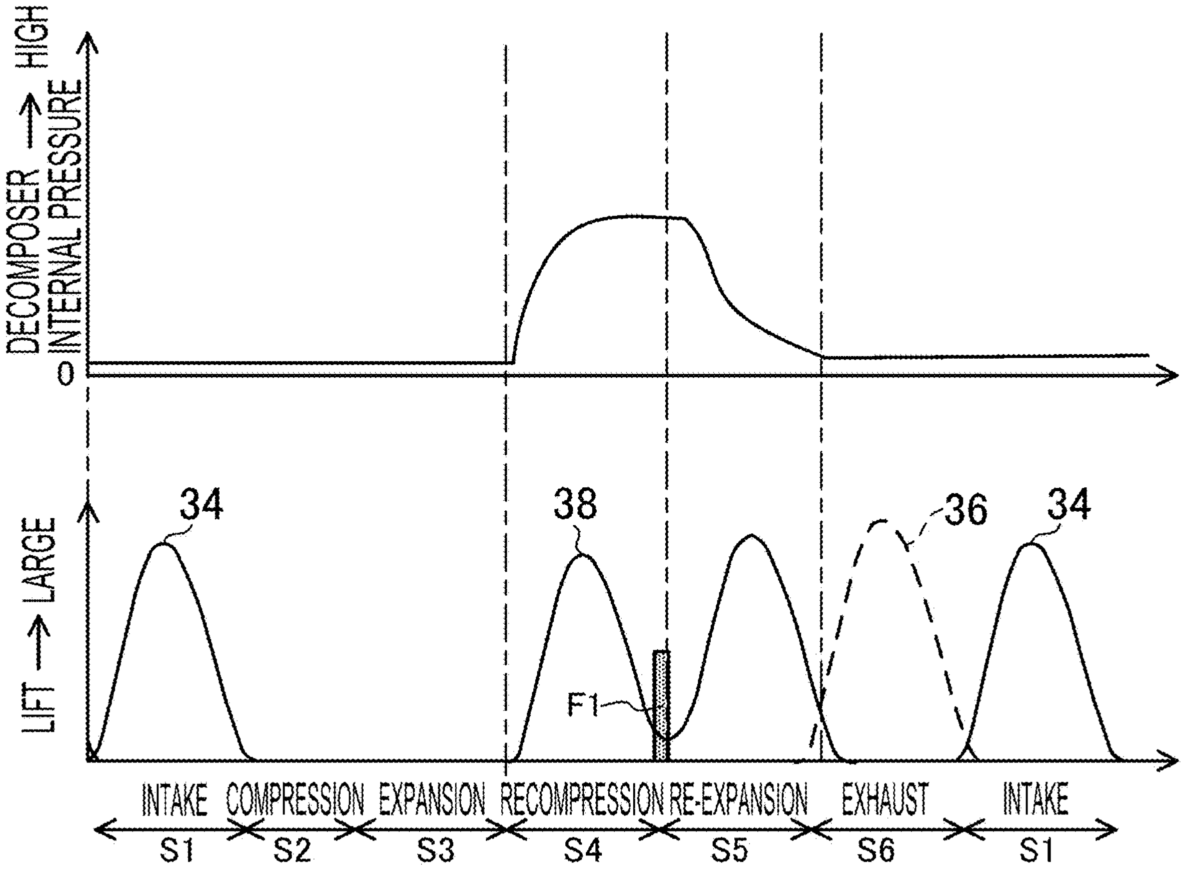
FIG. 4 illustrates examples of operation of each valve, injection timing of fuel to be reformed, and a change in an internal pressure of a decomposer, according to one or more embodiments of the present disclosure.

The engine 3 in this embodiment performs a six-stroke cycle in order for the decomposer 6 to decompose the hydrocarbon fuel. FIG. 3 illustrates each stroke thereof. FIG. 4 illustrates examples of the valve timing and the valve lift of each of the valves, the injection timing of the third port injector 46, and a change in an internal pressure of the decomposer 6 in the six-stroke cycle.

S1 is an intake stroke. In the intake stroke S1, the engine 3 introduces the intake air into the combustion chamber 3*a* by lowering the piston 32. In the intake stroke S1, the intake valve 34 is opened. The intake air is introduced into the combustion chamber 3*a* through the intake port 33. The intake air at least contains the fresh air.

The intake air may contain the EGR gas. The EGR gas is so-called external EGR gas that is recirculated into an intake pipe through an EGR passage. In the intake stroke S1, the exhaust valve 36 is opened. When the exhaust valve 36 is opened, the exhaust gas is introduced into the combustion chamber 3*a* through the exhaust port 35. The exhaust gas that is introduced into the combustion chamber 3*a* is so-called internal EGR gas. The on-off valve 38 of the third port 37 is closed.

In FIG. 3, the hydrogen injector 47 injects the hydrogen gas into the combustion chamber 3*a* during the intake stroke S1. The hydrogen injector 47 may inject the hydrogen gas in a compression stroke S2 following the intake stroke S1. The hydrogen injector 47 may inject the hydrogen gas in a period from the intake stroke S1 to the compression stroke S2.

When the hydrogen gas is insufficient, the intake port injector 44 may inject the hydrocarbon fuel into the intake port 33 so as to compensate for shortage in the intake stroke S1. When the hydrogen gas is unavailable, instead of the hydrogen injector 47, the intake port injector 44 may inject the hydrocarbon fuel into the intake port 33 in the intake stroke S1.

When the hydrogen gas to be supplied to the combustion chamber 3*a* is insufficient, the intake port injector 44 injects the hydrocarbon fuel, thereby securing a required fuel amount for the engine 3. The engine 3 can be operated by using the hydrocarbon fuel or using both of the hydrocarbon fuel and the hydrogen gas.

S2 is the compression stroke. In the compression stroke S2, the engine 3 compresses the air-fuel mixture in the combustion chamber 3*a* by raising the piston 32. The intake valve 34, the exhaust valve 36, and the on-off valve 38 are all closed.

The spark plug 27 ignites the air-fuel mixture in the combustion chamber 3*a* at timing near compression top dead center. The air-fuel mixture starts combustion. S3 is an expansion stroke. In the expansion stroke S3, the piston 32 is lowered by the combustion of the air-fuel mixture. The intake valve 34, the exhaust valve 36, and the on-off valve 38 are all closed.

S4 is a recompression stroke. In the recompression stroke S4, the engine 3 compresses combustion gas in the combustion chamber 3*a* by raising the piston 32. In the recompression stroke S4, the on-off valve 38 is opened. The compressed combustion gas is introduced into the decomposer 6 through the third port 37.

In addition, the third port injector 46 injects the hydrocarbon fuel into the third port 37 in the recompression stroke S4. In detail, as indicated by a reference sign F1 in FIG. 4, the third port injector 46 injects the fuel to be reformed in a latter half of the recompression stroke S4.

In the recompression stroke S4, a pressure of the combustion gas is increased over time. Thus, in the latter half of the recompression stroke S4, the internal pressure of the decomposer 6 is also kept high. Then, in the latter half of the recompression stroke S4, the high-pressure combustion gas flows into the decomposer 6. In this state, since the hydrocarbon fuel is injected toward the third port 37, the hydrocarbon fuel can be effectively dispersed in the combustion gas even when the third port 37 is narrow.

In this way, the high-temperature, high-pressure combustion gas in the homogenized state of the hydrocarbon fuel is introduced into the decomposer 6.

As described above, in the decomposer 6, the hydrocarbon fuel is decomposed into carbon and the hydrogen gas by using the heat and the pressure of the combustion gas and the catalyst. Since the hydrocarbon fuel is homogenized, the hydrocarbon fuel can efficiently contact the catalyst. Doe to the high temperature and the high pressure, the reforming reaction can be promoted. Accordingly, the hydrogen gas can be effectively produced.

Since the high pressure of the combustion gas in the recompression stroke S4 is applied to the inside of the decomposer 6, the hydrogen gas produced inside the decomposer 6 is rapidly delivered to the hydrogen gas supply section 5. Since the hydrogen gas inside the decomposer 6 is reduced, the decomposition reaction of the hydrocarbon fuel is promoted. The decomposer 6, which uses the pressure in the recompression stroke S4 of the engine 3, can produce a relatively large amount of the hydrogen gas even in a small size. Produced carbon is stored in the decomposer 6.

S5 is a re-expansion stroke. In the re-expansion stroke S5, the piston 32 is lowered. The on-off valve 38 is opened in the re-expansion stroke S5. When the on-off valve 38 is opened, some of the residual gas in the decomposer 6 is discharged from the decomposer 6 to the combustion chamber 3*a*. Since the inside of the decomposer 6 can be scavenged, the high-temperature combustion gases can be guided into the third port 37 in the next cycle. Opening of the on-off valve 38 in the re-expansion stroke S5 is advantageous in reducing pump loss of the engine 3.

S6 is an exhaust stroke. In the exhaust stroke S6, the engine 3 discharges the combustion gas in the combustion chamber 3*a* through the exhaust port 35 by raising the piston 32. In the exhaust stroke S6, the exhaust valve 36 is opened. The combustion gas in the combustion chamber 3*a* is discharged to the exhaust port 35. In the exhaust stroke S6, the intake valve 34 and the on-off valve 38 are closed.

After the exhaust stroke S6, the engine 3 returns to the intake stroke S1.

Instead of the on-off valve 38 being opened in the re-expansion stroke S5, or together with opening of the on-off valve 38, the on-off valve 38 may be opened in the intake stroke S1. When the on-off valve 38 is opened in the intake stroke S1, the residual gas can be discharged from the decomposer 6 to the combustion chamber 3*a*. The combustion gas is the EGR gas.

When the on-off valve 38 is not opened in the re-expansion stroke S5, the hydrocarbon fuel, which has been introduced in the decomposer 6 in the recompression stroke S4, remains in the decomposer 6 for a long time. Thus, it is possible to obtain an advantage of promoting the decomposition reaction of the hydrocarbon fuel.

The fuel reforming system 1 stores carbon produced by the decomposition of the hydrocarbon fuel in the decomposer 6. Then, the engine 3 combusts the hydrogen gas, which is produced by the decomposition of the hydrocarbon fuel. Thus, no carbon oxide is produced by the combustion. The fuel reforming system 1 can become carbon neutral.

The fuel reforming system 1 also decomposes the hydrocarbon fuel by using the heat and the pressure generated by the engine 3. Accordingly, a separate dedicated device is not required. The fuel reforming system 1 is useful as the in-vehicle system.

Figure 5:
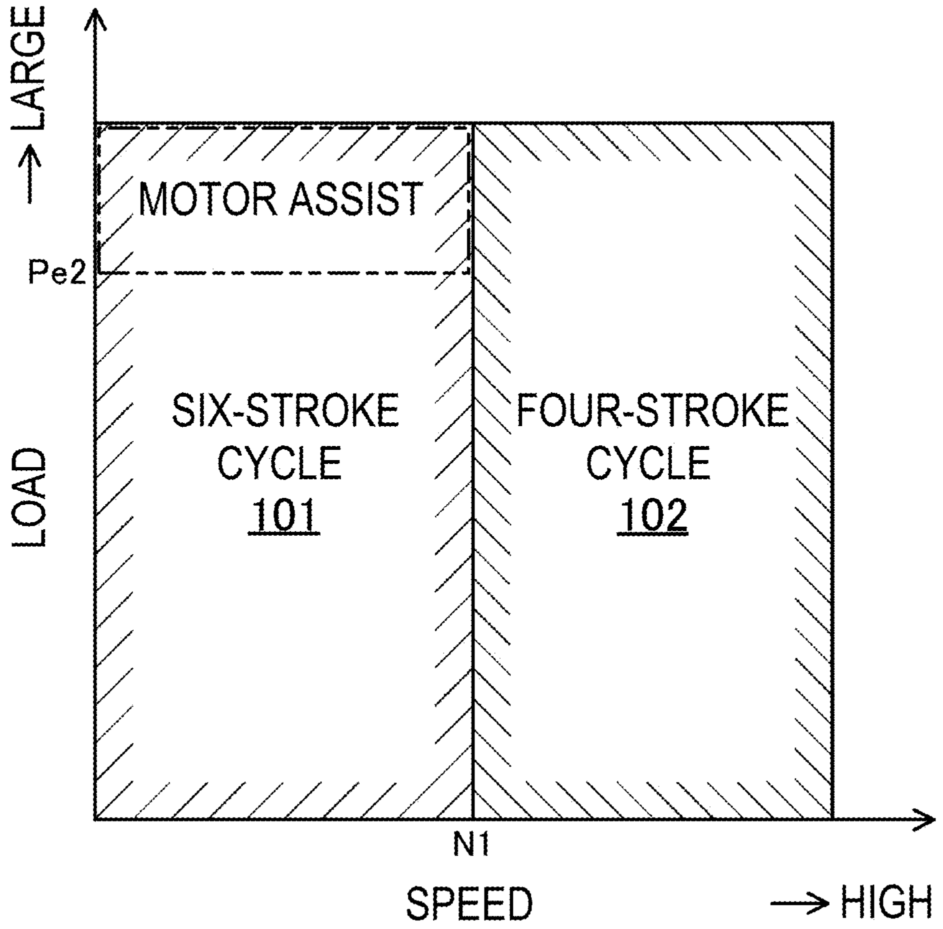
FIG. 5 is an example of a control map according to one or more embodiments of the present disclosure.

FIG. 5 illustrates a control map of the engine 3. The control map corresponds to an operating region of the engine 3 that is defined by the speed and the required load of the engine 3. The controller 21 operates the engine 3 according to the control map.

The control map divides the operating region of the engine 3 into a first region 101 and a second region 102. The first region 101 is a region where the speed is lower than a first speed N1. The second region 102 is a region where the speed is equal to or higher than the first speed N1. The first speed N1 may be a speed that is included in a medium speed region in the case where the operating region of the engine 3 is divided equally into three of a low speed region, the medium speed region, and a high speed region in a direction of the speed.

The controller 21 causes the engine 3 to perform the six-stroke cycle in the first region 101. The hydrogen gas is used as the fuel while carbon is collected from the hydrocarbon fuel. Thus, the engine 3 can become carbon neutral.

Meanwhile, due to the large number of strokes, output is smaller in the six-stroke cycle than in a typical four-stroke cycle. Thus, in this vehicle, in the case where the six-stroke cycle is performed, and the required load of the engine 3 is equal to or greater than a predetermined load Pe2, the inverter 28 is controlled to drive the drive motor. In this way, the insufficient output of the engine 3 is compensated (motor assist).

The load Pe2 may be a load included in a high-load region in the case where the operating region of the engine 3 is equally divided into three of low-load, medium-load, and high-load regions in a load direction.

In the second region 102, the controller 21 operates the engine 3 in the normal four-stroke cycle including the intake stroke, the compression stroke, the expansion stroke, and the exhaust stroke.

More specifically, the controller 21 stops opening/closing of the on-off valve 38. In a period from the intake stroke to the compression stroke, the hydrocarbon fuel is injected as the fuel from the intake port injector 44. The hydrogen gas may be used as the fuel. The engine 3 has a mechanism that changes a speed ratio between the crankshaft and the camshaft when the stroke cycle is switched between the six-stroke cycle and the four-stroke cycle.

(Decomposer)

Figure 6:
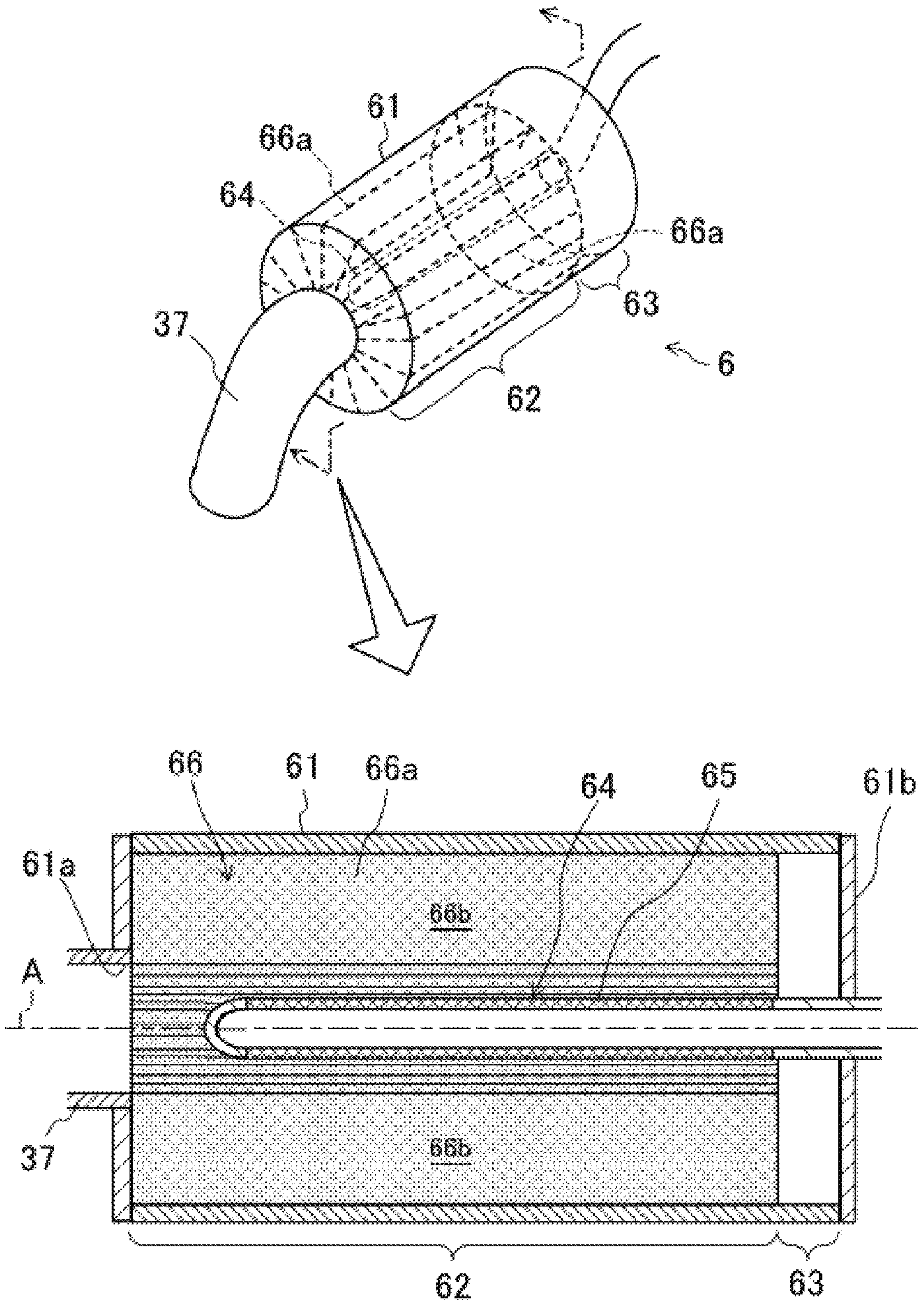
FIG. 6 is a schematic view illustrating a structure of a decomposer according to one or more embodiments of the present disclosure.

FIG. 6 illustrates an example of the decomposer 6 improved by application of the disclosed technique. The exemplified decomposer 6 has a sealed cylindrical case 61. An opening 61*a* is formed at one end of the case 61, and the third port 37 is connected to the opening 61*a*. The decomposer 6 communicates with the combustion chamber 3*a* via the third port 37. The other end of the case 61 is sealed with an end wall 61*b*.

The inside of the case 61 is partitioned into two spaces. More specifically, the inside of the case 61 is partitioned into: a reforming space 62 that is located on a side of a connection portion with the third port 37; and an additional space 63 that is located on an opposite side of the connection portion with the third port 37. The reforming space 62 and the additional space 63 are adjacent to each other. The reforming space 62 is larger, and the reforming space 62 occupies a significant portion of the inside of the case 61.

A collector pipe 64 is attached to the case 61. The collector pipe 64 penetrates the end wall and extends along a center line A of the case 61. A protruding end of the collector pipe 64 is located near the opening 61*a*. A significant portion of the collector pipe 64 in the case 61 is formed of a hydrogen permeable membrane 65 supported by a porous ceramic.

A reforming member 66 including a catalyst 66*b* is incorporated in the reforming space 62. The reforming reaction occurs in the reforming member 66. The exemplary reforming member 66 may be regarded as a reformer and can includes plural plate-shaped carriers 66*a*. These carriers 66*a* are radially attached to an inner wall of the case 61 and extend along the center line A of the case 61. A protruding end of each of the carriers 66*a* is located around the collector pipe 64.

A surface of each of the carriers 66*a* is covered with the catalyst 66*b*. An example of the catalyst 66*b* that can be used to decompose the hydrocarbon fuel is Ni—Al—Fe alloy. Any of various types of the catalysts can be used as the catalyst 66*b* as long as the catalyst 66*b* can be used to decompose the hydrocarbon fuel. The exemplary reforming member 66 can increase a surface area of the catalyst 66*b*. Since the combustion gas containing the hydrocarbon fuel and the catalyst 66*b* are easily brought into contact with each other, it is advantageous to decompose the hydrocarbon fuel.

Figure 7:
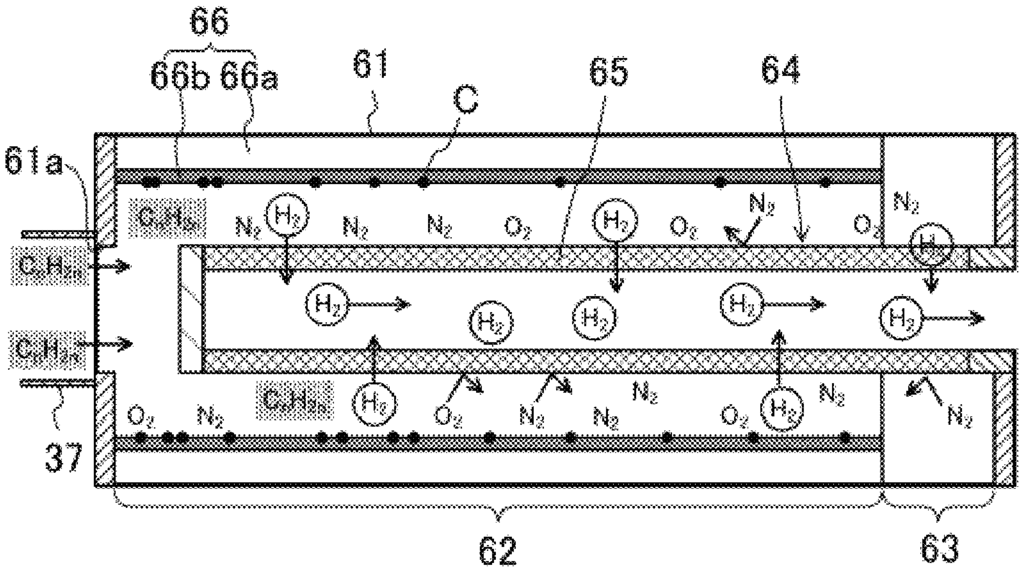
FIG. 7 is a schematic view illustrating a function of the decomposer according to one or more embodiments of the present disclosure.

FIG. 7 is a schematic view of the decomposer 6 for illustrating a function of the reforming member 66. As described above, in the recompression stroke S4, the hydrocarbon fuel is introduced into the decomposer 6 from the third port 37 together with the high temperature, high-pressure combustion gas (which may include the air). Then, in the reforming member 66, the hydrocarbon fuel comes into contact with the catalyst 66*b*, whereby the reforming reaction (partial oxidation reaction when the air is contained in the combustion gas) occurs.

As a result, the hydrocarbon fuel is decomposed into carbon (denoted by the reference sign C) and the hydrogen gas. Carbon produced by the decomposition of the hydrocarbon fuel adheres, in a separable state, to the surface of the catalyst 66*b*. Then, carbon is deposited and covers the surface of the catalyst 66*b*. Thus, the decomposer 6 holds and stores the carbon.

When an adhering amount of carbon is increased, the combustion gas containing the hydrocarbon fuel hardly comes into contact with the catalyst 66*b*, and thus the production of the hydrogen gas is inhibited. The decomposition performance of the decomposer 6 deteriorates. To handle this, even when the adhering amount of carbon is increased, the state of the reforming member 66 can be reset by separating and eliminating carbon from the catalyst 66*b*. A yield of the hydrogen gas is recovered, and decomposition capacity of the decomposer 6 can be maintained.

Since the carrier 66*a* is formed in the plate shape that extends along the center line A of the case 61, carbon, which has been separated from the catalyst 66*b*, can be easily eliminated. That is, with the combustion gas introduced into the decomposer 6, carbon, which has been separated from the catalyst 66*b*, can be collected on the opposite side of the opening 61*a*. The form of the carrier 66*a* can be appropriately changed according to the specifications. For example, the carrier 66*a* may be a large number of balls.

The hydrogen permeable membrane 65 has pores in a molecular size and has a function to selectively allow the hydrogen gas to permeate. The hydrogen gas that is produced inside the reforming member 66 permeates the hydrogen permeable membrane 65 by the pressure of the combustion gas, and flows into the collector pipe 64.

As illustrated in FIG. 1, the hydrogen gas that has flowed into the collector pipe 64 is delivered to the hydrogen gas supply section 5. Meanwhile, most of the other gases such as nitrogen gas and oxygen gas do not permeate the hydrogen permeable membrane 65. For this reason, these gases remain inside the reforming member 66 (residual gas).

(Structural Problems of Decomposer)

The decomposer preferably has the high yield of the hydrogen gas. Accordingly, the reforming member 66 that causes the reforming reaction is usually provided in the entire interior of the case 61. The decomposer prior to the application of the disclosed technique is also the same.

However, this type of the decomposer has a closed pipe structure, one end of which is open 61*a* and the other end of which is closed. Thus, such a problem has been acknowledged that, when the combustion gas is introduced, the entire reforming member 66 cannot be effectively used due to an influence of the residual gas.

Figure 8A:
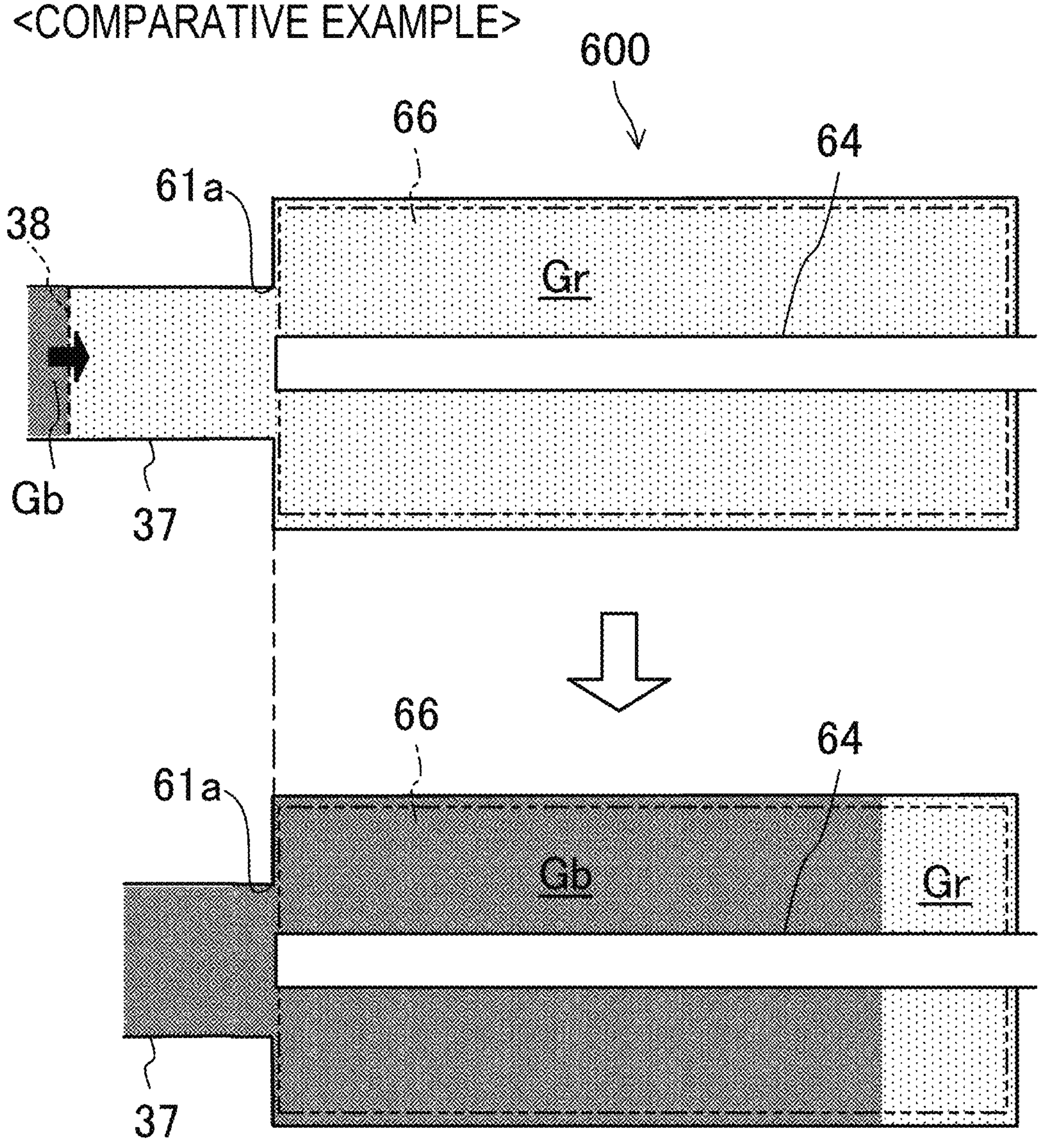
FIG. 8A is a view illustrating a structural problem of the decomposer (a comparative example).

FIG. 8A illustrates, as a comparative example, a decomposer (pre-improvement decomposer 600) prior to the application of the disclosed technique in a simplified manner. In the pre-improvement decomposer 600, the reforming member 66 is provided in the entire interior of the case 61. Before the recompression stroke S4 in which the combustion gas is introduced into the pre-improvement decomposer 600, the on-off valve 38 is closed. Residual gas Gr remains inside the third port 37 and the pre-improvement decomposer 600.

Then, in the recompression stroke S4, the on-off valve 38 is opened, and the hydrocarbon fuel is injected from the third port injector 46. As the piston 32 is raised, as illustrated in a top view of FIG. 8A, combustion gas Gb, along with the hydrocarbon fuel, is introduced from the third port 37 side into the pre-improvement decomposer 600. The combustion gas Gb has a higher pressure than the residual gas Gr.

Since the pre-improvement decomposer 600 has a closed pipe structure, the residual gas Gr has no place to flow. Since the reforming space 62 is occupied by the reforming member 66, a flow rate of the combustion gas Gb is reduced, and the combustion gas Gb is less likely to be mixed with the residual gas Gr.

Accordingly, the residual gas Gr is pushed into the back of the case 61 while being compressed by the combustion gas Gb. As a result, a mass of the residual gas Gr at the same pressure as the combustion gas Gb is formed in the back of the case 61. The mass of the residual gas Gr has a lower temperature than the combustion gas Gb and does not contain the hydrocarbon fuel. The mass of the residual gas Gr also contains a large amount of inert gas.

Thus, in the portion occupied by the mass of the residual gas Gr, the reforming reaction does not occur even with the presence of the reforming member 66. That is, the entire reforming member 66 cannot be effectively used. A boundary between the mass of the residual gas Gr and the combustion gas Gb is not necessarily clear unlike that illustrated in FIG. 8A. There may be some width, shade, variation, or the like.

Meanwhile, in the decomposer according to one or more embodiments of the present disclosure, to which the disclosed technique is applied, that is, the decomposer 6 as described above, the inside of the case 61 is partitioned into the reforming space 62 located on the third port 37 side and the additional space 63 located on the opposite side. The reforming member 66 is installed in the reforming space 62, and the additional space 63 is an empty space for a purpose of accommodating the mass of the residual gas Gr.

Figure 8B:
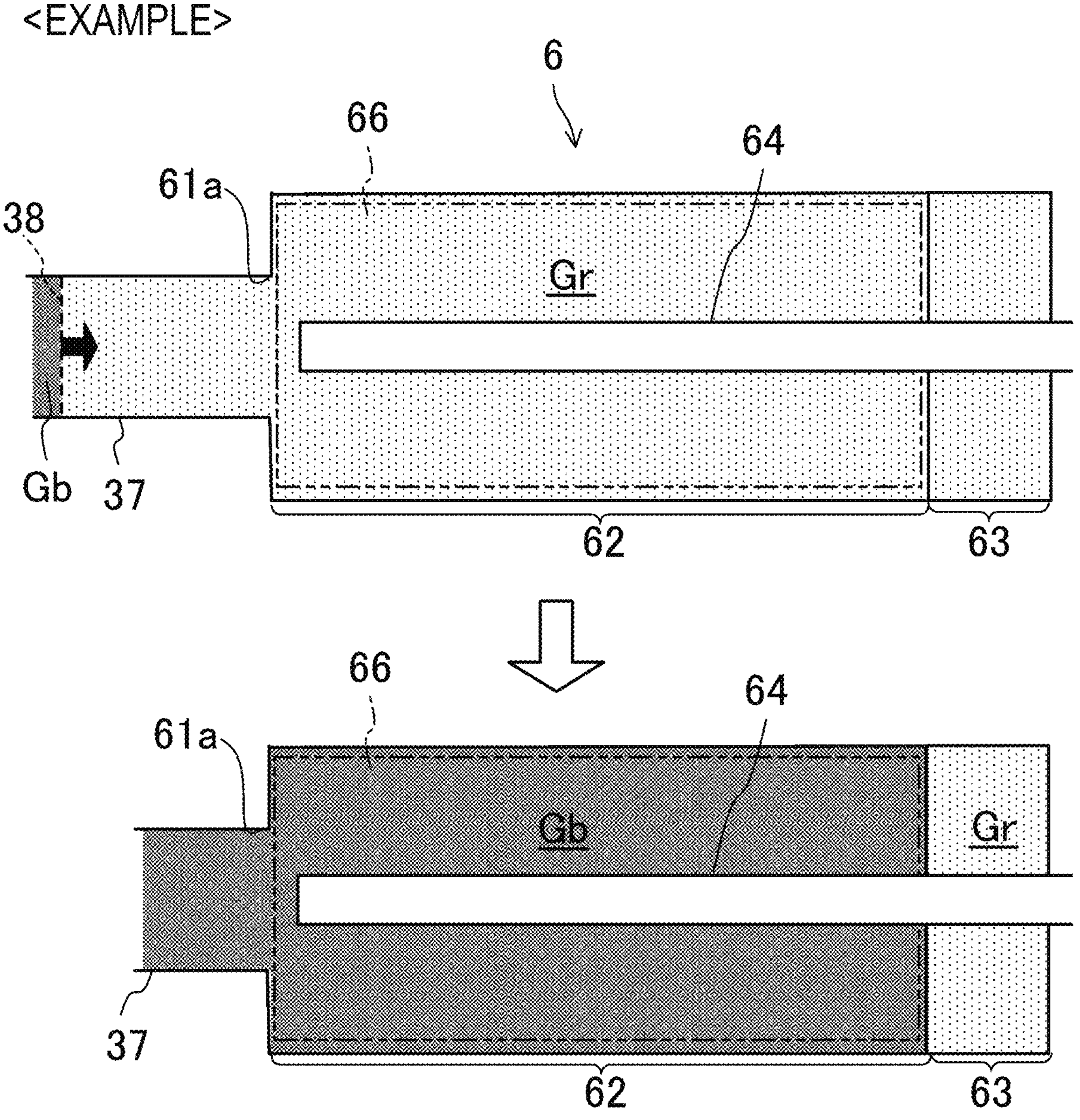
FIG. 8B is a view illustrating the structural problem of the decomposer (an example).

FIG. 8B illustrates, as an example, the decomposer 6 in the simplified manner as in the comparative example. That is, the additional space 63 is a space in which the residual gas Gr is pushed and accommodated when the combustion gas Gb is introduced into the decomposer 6 in the recompression stroke S4. A pressure of the combustion gas Gb in the reforming space 62 is balanced with a pressure of the residual gas Gr in the additional space 63.

A volume of the additional space 63 may be equal to or greater than a volume of the mass of the residual gas Gr. However, from a viewpoint of effective utilization of the reforming member 66, and the like, the volume of the additional space 63 is preferably substantially the same as the volume of the mass of the residual gas Gr. Here, the volume of the additional space 63 is, for example, the volume when the internal pressure of the decomposer 6 is the highest.

When the inventors of the present disclosure studied by a CFD analysis, it was confirmed that a sufficient volume required for the additional space 63 can be calculated and identified from a volume of the combustion chamber 3*a*, a volume of the third port 37, a volume of the decomposer 6, a compression ratio of the engine 3, and the like.

For the above reason, the decomposer 6 is provided with the additional space 63 having the sufficient volume. Accordingly, when the combustion gas Gb is introduced into the decomposer 6 in the recompression stroke S4, the residual gas Gr is pushed and accommodated in the additional space 63. The reforming space 62 is filled with the combustion gas Gb. In the case of this fuel reforming system 1, the entire reforming member 66 can be effectively used even in the decomposer 6 having the closed pipe structure.

Since the volume of the additional space 63 is substantially the same as that of the residual gas Gr, the combustion gas Gb hardly flows into the additional space 63. The almost all amount of the hydrocarbon fuel injected as the reformed fuel can be brought into contact with the catalyst 66*b*. Since the internal pressure of the decomposer 6 can be maintained high, it is advantageous for the reforming reaction. In addition, since the hydrogen gas can rapidly permeate, the production of the hydrogen gas can be promoted.

The yield of the hydrogen gas can be effectively improved by the very simple improvement. Since a large-scale change is unnecessary, the disclosed technique can be easily implemented. Therefore, the disclosed technique has excellent practicality.

Since the volume of the additional space 63 is set according to the residual gas Gr that is compressed in the recompression stroke S4, the volume thereof can also be reduced. Thus, the decomposer 6 can be made compact in size.

<Modifications of Fuel Reforming System>

Figure 9:
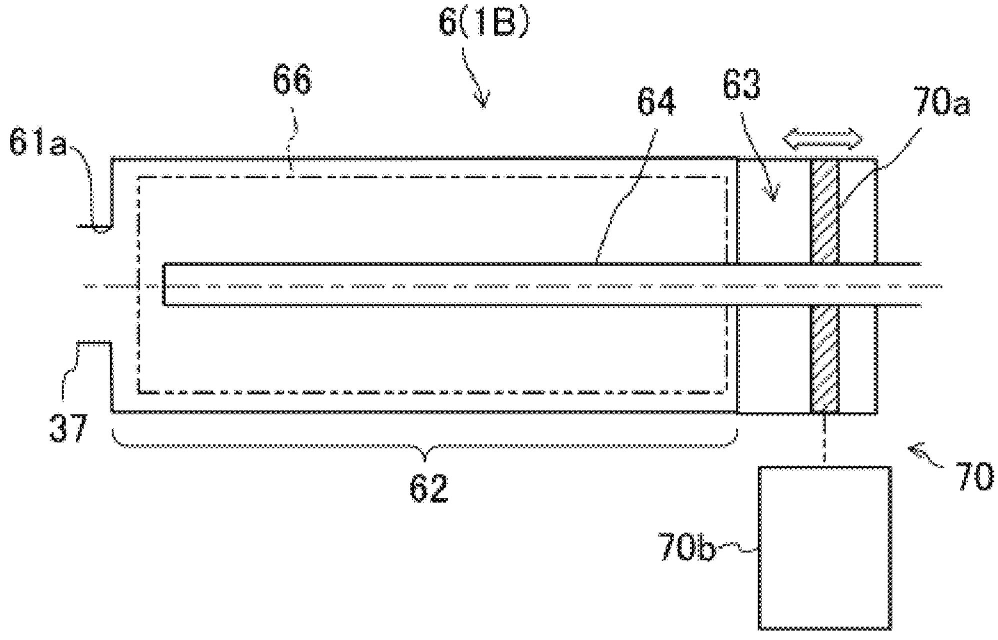
FIG. 9 is a schematic view illustrating a second fuel reforming system according to one or more embodiments of the present disclosure.

FIG. 9 illustrates a modification of the fuel reforming system 1 (second fuel reforming system 1B) in a simplified manner. As described above, the second fuel reforming system 1B further includes the slide device 70 (an example of the variable volume mechanism) that varies the volume of the additional space 63. Then, the volume of the additional space 63 is varied by the slide device 70 according to the operating state of the engine 3.

More specifically, the slide device 70 has a disk-shaped slider 70*a* in a portion on an opposite side of the connection portion of the case 61 with the third port 37. An outer peripheral edge of the slider 70*a* is in close contact with an inner peripheral surface of the case 61. Then, the collector pipe 64 penetrates the central portion thereof. The slider 70*a* has a seal and is configured to prevent gas leakage from a clearance therebetween.

The slider 70*a* is driven by an attached drive unit 70*b*. Accordingly, the slider 70*a* slides along the center line A of the case 61. A space between the reforming space 62 and the slider 70*a* corresponds to the additional space 63. Due to movement of the slider 70*a*, the volume of the additional space 63 is changed to be increased or reduced. As a structure of the slide device 70, various forms are considered. The optimum form may be selected according to the specification.

For example, the slider 70*a* may be connected to a predetermined crank, and rotational motion of the crank may be converted into reciprocating motion of the slider 70*a*. Alternatively, the slider 70*a* may reciprocate by attaching a rack to the slider 70*a* and rotating a predetermined pinion that meshes with the rack. Further alternatively, the slider 70*a* may be coupled to a predetermined hydraulic piston, and the slider 70*a* may reciprocate by hydraulic control.

In order to position the slider 70*a*, for example, in the case of using the crank, a rotation angle thereof may be controlled by using a variable valve timing mechanism such as the above-described intake valve train. When the rack and a pinion are used, the pinion may be driven by a servo motor to control a rotation angle thereof. In the case of using the hydraulic piston, the position of the slider 70*a* may be detected by a sensor, and the hydraulic pressure may be controlled based on the position.

In general, as the load of the engine 3 is increased, required combustion energy is increased. Thus, the pressure (temperature) of the combustion gas Gb is increased as the load of the engine 3 is increased. Accordingly, in the recompression stroke S4, a difference (differential pressure) between the pressure of the residual gas Gr remaining in the decomposer 6 and the pressure of the combustion gas Gb introduced from the combustion chamber 3*a* into the decomposer 6 is large when the load of the engine 3 is large, and is small when the load of the engine 3 is small.

When the differential pressure is small, the mass of the residual gas Gr is increased. Meanwhile, when the differential pressure is large, the residual gas Gr is further compressed. Thus, the mass of the residual gas Gr is reduced. Accordingly, when the load of the engine 3 is changed, the optimum volume of the additional space 63 is also changed.

Meanwhile, in the second fuel reforming system 1B, the volume of the additional space 63 is configured to be varied. Thus, the volume of the additional space 63 can be changed and optimized. That is, the controller 21 outputs a control signal to the drive unit 70*b* according to the load of the engine 3. Then, the slider 70*a* moves to a position where the volume of the additional space 63 becomes optimum with the load.

For example, when the required load for the engine 3 is increased, the controller 21 moves the slider 70*a* in a manner to reduce the volume of the additional space 63 according to the required load. In this way, it is possible to introduce the large amount of the high-temperature, high-pressure combustion gas Gb into the reforming space 62 without flowing into the additional space 63. Thus, the reforming member 66 can be effectively used, and the large amount of the hydrogen gas can be produced.

<Application Example of Fuel Reforming System>

Figure 10:
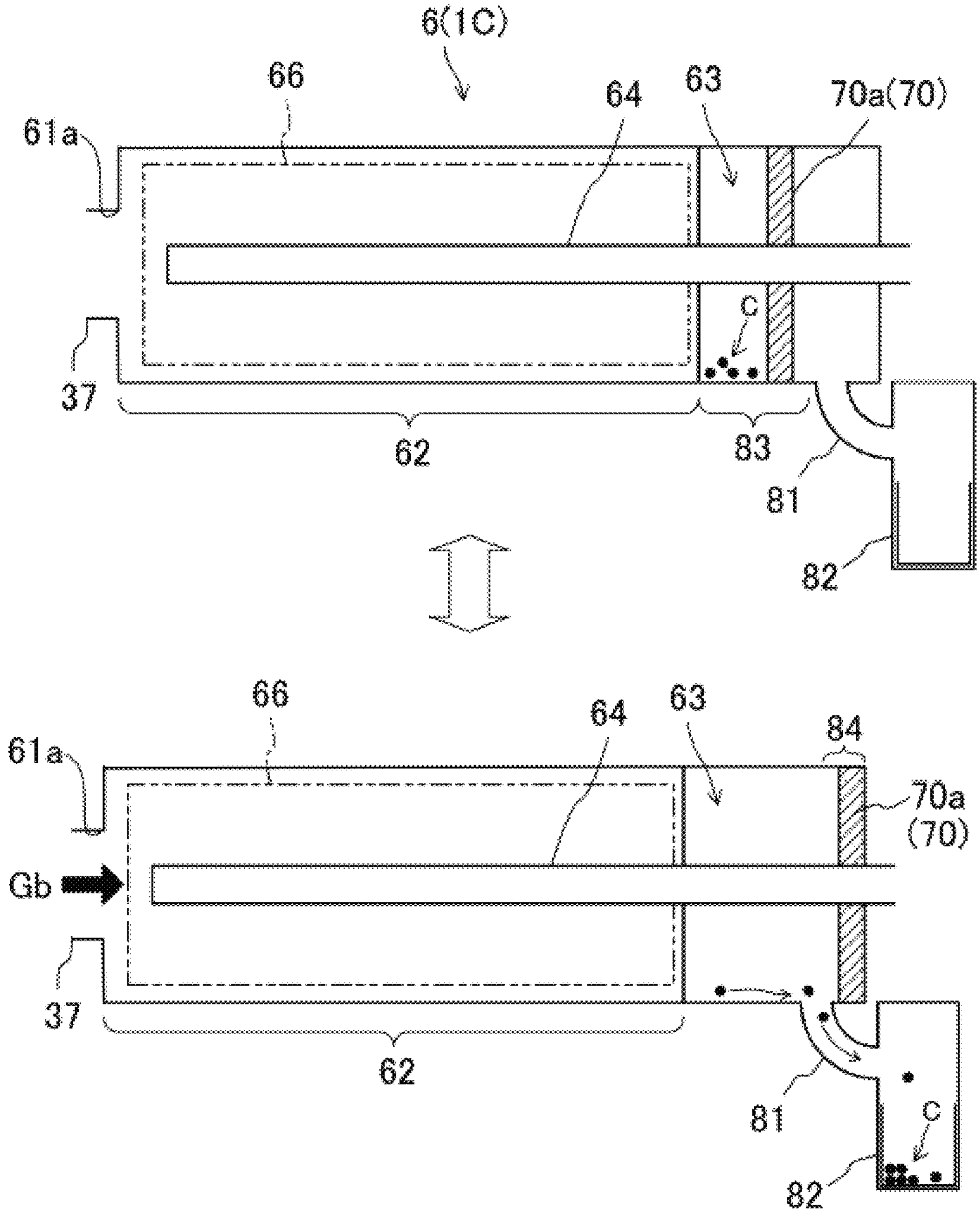
FIG. 10 is a schematic view illustrating a third fuel reforming system according to one or more embodiments of the present disclosure.

FIG. 10 illustrates an application example of the fuel reforming system 1 (third fuel reforming system 1C). The third fuel reforming system 1C is obtained by further improving the second fuel reforming system 1B.

As illustrated in FIG. 2, similar to the second fuel reforming system 1B, the third fuel reforming system 1C includes the slide device 70 that varies the volume of the additional space 63. The third fuel reforming system 1C also includes the carbon remover 80. The carbon remover 80 separates the carbon adhering to the catalyst 66*b* from the catalyst 66*b* by processing to apply a physical impact onto the carrier 66*a*, scrape the surface of the carrier 66*a* with a scraper, or the like, for example.

The third fuel reforming system 1C is devised such that carbon can be automatically discharged from the decomposer 6 and collected.

In the case of the exemplified decomposer 6, the opposite side of the opening 61*a* in the case 61 is expanded. One end of a discharge passage 81 is connected to the expanded portion. The other end of the discharge passage 81 is connected to a collection box 82. The collection box 82 collects and temporarily stores carbon to be discharged until carbon is collected.

As illustrated in a top view of FIG. 10, at a position (control position 83) in a range where the slider 70*a* moves according to the required load of the engine 3, a space between the discharge passage 81 and the additional space 63 is blocked by the slider 70*a*. Thus, the discharge passage 81 does not communicate with the additional space 63. Meanwhile, as illustrated in a bottom view of FIG. 10, when the slider 70*a* moves to a predetermined position (discharge position 84) provided in the expanded portion, the discharge passage 81 communicates with the additional space 63.

As described above, when the combustion gas Gb is introduced from the third port 37, carbon, which has been separated from the catalyst 66*b*, is collected on the opposite side of the opening 61*a*, that is, in the additional space 63. Accordingly, when the combustion gas Gb is introduced from the third port 37 in a state where the discharge passage 81 communicates with the additional space 63, carbon can be discharged to the collection box 82 through the discharge passage 81.

Since carbon stored inside the decomposer 6 can be automatically removed, the state of the reforming member 66 can be reset as necessary. The yield of the hydrogen gas is recovered, and the decomposition capacity of the decomposer 6 can be maintained in the appropriate state.

Switching of the communication state between the discharge passage 81 and the additional space 63 is not limited to the exemplary form. For example, a lid body may be provided in a connection portion of the case 61 with the discharge passage 81, and the lid body may be opened/closed. In short, the discharge passage 81 may be configured to be openable/closable.

(Specific Example of Control of Third Fuel Reforming System)

Figure 11A:
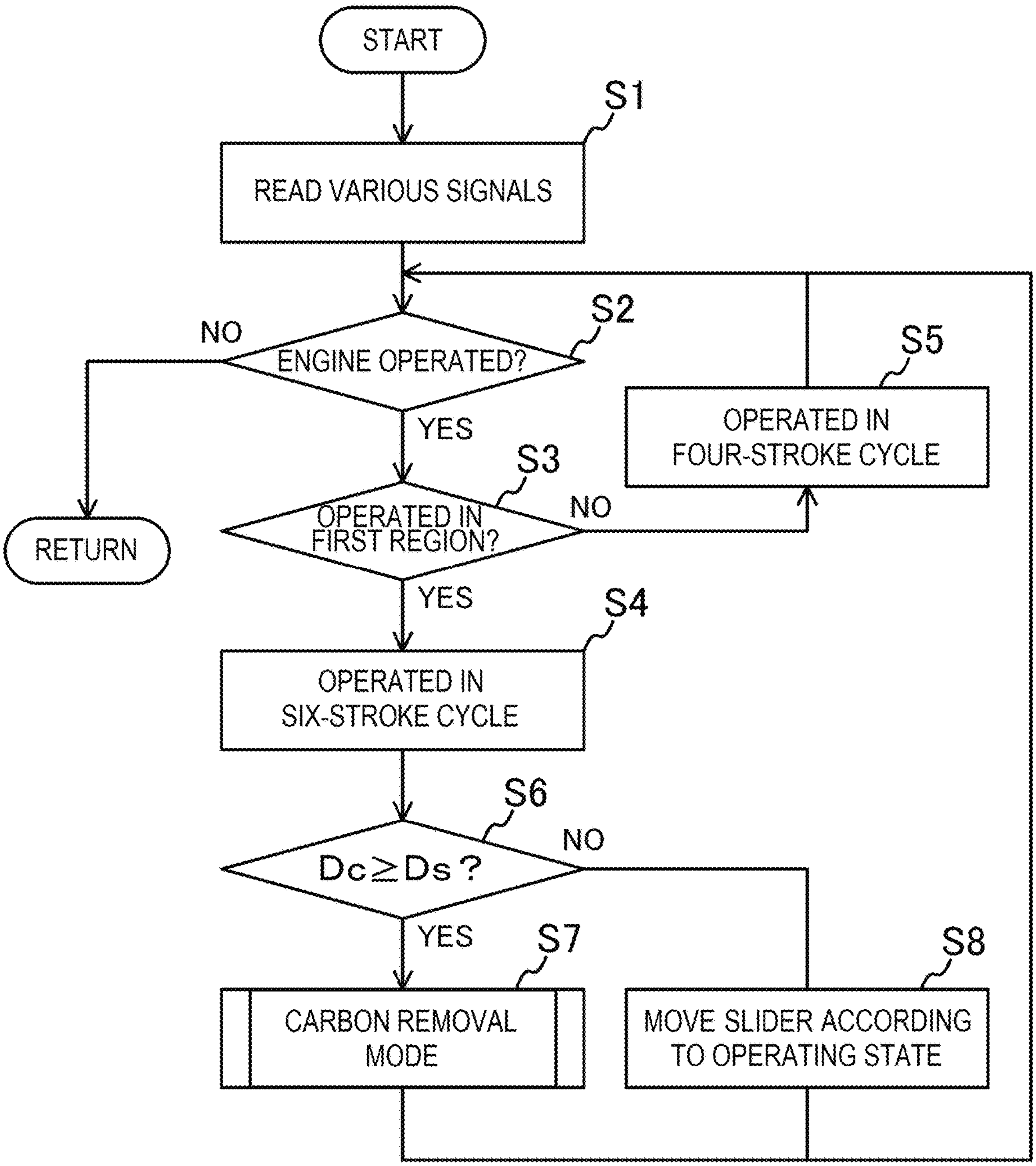
FIG. 11A is a flowchart of control by the third fuel reforming system according to one or more embodiments of the present disclosure.
Figure 11B:
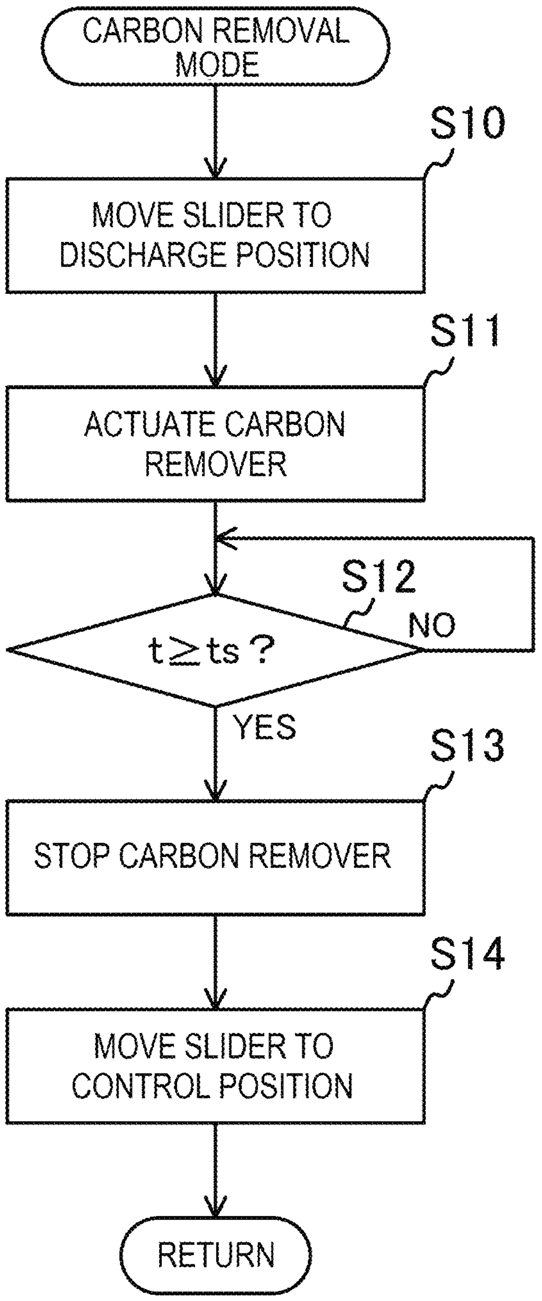
FIG. 11B is a flowchart of control by the third fuel reforming system according to one or more embodiments of the present disclosure.

FIG. 11A and FIG. 11B illustrate an example of the control of the third fuel reforming system 1C.

The controller 21 reads the various signals input from the accelerator sensor 23 and the like (step S1). During the operation of the engine 3, the controller 21 identifies the output required for the engine 3 based on the read signals, and executes the operation (Yes in step S2). Then, with termination of the operation of the engine 3, the control by the controller 21 is also terminated (No in step S2).

The controller 21 refers to the control map and determines whether the engine 3 is operated in the first region 101 (step S3).

As a result, if the engine 3 is operated in the first region 101, the controller 21 executes the operation in the six-stroke cycle, that is, the operation using the hydrogen gas as the main fuel (step S4). On the other hand, if the engine 3 is not operated in the first region 101, that is, operates in the second region 102, the controller 21 executes the operation in the four-stroke cycle, that is, the operation using the hydrocarbon fuel as the main fuel (step S5).

When the engine 3 is operated in the six-stroke cycle, the controller 21 estimates the carbon deposition amount in the catalyst 66*b* based on the signals from the hydrogen gas sensor 25 and the like. When the carbon deposition amount is excessive, the function of the catalyst 66*b* is impaired. As a result, the produced amount of the hydrogen gas is reduced.

The controller 21 compares an upper limit value Ds of the carbon deposition amount, which is set in advance based on an experiment or the like, with an estimated value Dc of the carbon deposition amount (step S6). As a result, if it is determined that the estimated value Dc of the carbon deposition amount is equal to or greater than the upper limit value Ds of the carbon deposition amount, the controller 21 executes a carbon removal mode (step S7).

FIG. 11B illustrates an example of control in the carbon removal mode. In the carbon removal mode, the controller 21 outputs the control signal to the slide device 70, and moves the slider 70*a* to the discharge position 84 illustrated in the bottom view of FIG. 10 (step S10). Then, the controller 21 outputs the control signal to the carbon remover 80 to activate the carbon remover 80 (step S11). In this way, the carbon that has adhered to the catalyst 66*b* is separated from the catalyst 66*b*.

The controller 21 determines whether a predetermined carbon removal time ts, which is set in advance based on an experiment or the like, has elapsed (step S12). The carbon removal time ts is a sufficient time to reset the catalyst 66*b* and is set according to performance of the carbon remover 80.

If the carbon removal time ts has elapsed, the controller 21 stops the carbon remover 80 (step S13). During this time, since the engine 3 is operated in the six-stroke cycle, the combustion gas Gb is repeatedly introduced into the decomposer 6. The hydrocarbon fuel may not be injected from the third port injector 46. That is, only the combustion gas Gb may be introduced.

At this time, since the inside of the decomposer 6 communicates with the collection box 82 via the discharge passage 81, the combustion gas Gb easily flows. In this way, separated carbon is discharged from the decomposer 6 to the collection box 82 through the additional space 63 and the discharge passage 81.

Next, the controller 21 moves the slider 70*a* to the control position 83 in order to execute the normal operation in the six-stroke cycle (step S14). Then, the processing returns to that in FIG. 11A.

On the other hand, if it is determined that the estimated value Dc of the carbon deposition amount is less than the upper limit value Ds of the carbon deposition amount (No in step S6), the controller 21 moves the slider 70*a* according to the operating state of the engine 3 (step S8). That is, the volume of the additional space 63 is optimized according to the required load of the engine 3.

During the operation of the engine 3, the controller 21 repeats such processing.

Note that the disclosed technique is not limited to the above-described embodiments, and includes various other configurations. For example, the individual configurations of the first to third fuel reforming systems may be appropriately combined as necessary. The vehicle to which the disclosed technique can be applied is not limited to a hybrid vehicle. The drive source may be the reciprocating engine only.

Embodiments of the disclosed subject matter can also be as set forth according to the following brackets/parentheticals.

[1]A fuel reforming system for a vehicle, on which a reciprocating engine is mounted, wherein in the reciprocating engine, a combustion chamber where combustion occurs is partitioned inside a cylinder in which a piston reciprocates, the fuel reforming system comprising:

a decomposer that decomposes hydrocarbon fuel into carbon and hydrogen gas using heat and a pressure of combustion gas produced in the combustion chamber and a catalyst and holds the carbon; and a hydrocarbon fuel supply that supplies the hydrocarbon fuel to the decomposer, wherein the decomposer communicates with the combustion chamber via an openable/closable port, a reforming space in which a reformer including the catalyst is on a side of a connection portion of the decomposer with the openable/closable port, and on an opposite side of an interior of the connection portion of the decomposer with the port, an additional space is adjacent to the reforming space, wherein in the additional space, residual gas that remains in the port and the decomposer is accommodated under a condition where the combustion gas is introduced into the decomposer through the openable/closable port.

[2]

The fuel reforming system according to [1], further comprising:

a variable volume mechanism to vary a volume of the additional space, wherein the volume of the additional space is varied according to an operating state of the reciprocating engine.

[3]

The fuel reforming system according to [1] or [2], wherein the carbon is held in a separable state in the decomposer, and an openable/closable discharge passage is connected to the additional space and is configured to discharge the carbon separated from the decomposer.

[4]

The fuel reforming system according to any one of [1] to [3], wherein the reciprocating engine is configured to perform a six-stroke cycle including:

an intake stroke in which at least intake air is introduced into the combustion chamber through an intake port by lowering the piston;

a compression stroke in which air-fuel mixture containing the hydrogen gas supplied to the combustion chamber is compressed by raising the piston;

an expansion stroke in which the piston is lowered by combustion of the air-fuel mixture;

a recompression stroke in which the combustion gas is compressed by raising the piston;

a re-expansion stroke in which the piston is lowered; and an exhaust stroke in which exhaust gas is discharged through an exhaust port by raising the piston, and in the recompression stroke, the combustion gas is introduced into the decomposer through the port, and the residual gas is thereby pushed and accommodated in the additional space.

[5]

The fuel reforming system according to any one of [1] to [4], wherein the decomposer is adjacent to an exhaust port of the reciprocating engine.

[6]

The fuel reforming system according to any one of [1] to [5], wherein the openable/closable port is adjacent to an exhaust port of the reciprocating engine.

[7]

The fuel reforming system according to any one of [1] to [6], wherein a total internal volume of the additional space is less than a total internal volume of the reforming space, and no portion of the additional space is adjacent to the connection portion of the decomposer with the openable/closable port.

[8]

The fuel reforming system according to any one of [1] to [7], wherein the reforming space and the additional space each circumscribe a collector pipe extending into the decomposer from the opposite side opposite the connection portion.

[9]

The fuel reforming system according to any one of [1] to [8], wherein the additional space circumscribes a portion of a hydrogen permeable membrane.

[10]

A method regarding a fuel reforming system for a vehicle, on which a reciprocating engine is mounted, wherein in the reciprocating engine, a combustion chamber where combustion occurs is partitioned inside a cylinder in which a piston reciprocates, the method comprising:

providing a decomposer that decomposes hydrocarbon fuel into carbon and hydrogen gas using heat and a pressure of combustion gas produced in the combustion chamber and a catalyst and holds the carbon; and providing a hydrocarbon fuel supply that supplies the hydrocarbon fuel to the decomposer, wherein the decomposer communicates with the combustion chamber via an openable/closable port, a reforming space in which a reformer including the catalyst is on a side of a connection portion of the decomposer with the openable/closable port, and on an opposite side of an interior of the connection portion of the decomposer with the port, an additional space is adjacent to the reforming space, wherein in the additional space, residual gas that remains in the decomposer is accommodated under a condition where the combustion gas is introduced into the decomposer through the openable/closable port.

[11]

The method according to [10], further comprising:

decomposing, using the decomposer, the hydrocarbon fuel into the carbon and the hydrogen gas using the heat and the pressure of combustion gas produced in the combustion chamber and the catalyst; and holding the carbon.

[12]

The method according to [10] or [11], further comprising performing a six-stroke cycle including:

an intake stroke in which at least intake air is introduced into the combustion chamber through an intake port by lowering the piston;

a compression stroke in which air-fuel mixture containing the hydrogen gas supplied to the combustion chamber is compressed by raising the piston;

an expansion stroke in which the piston is lowered by combustion of the air-fuel mixture;

a recompression stroke in which the combustion gas is compressed by raising the piston;

a re-expansion stroke in which the piston is lowered; and an exhaust stroke in which exhaust gas is discharged through an exhaust port by raising the piston, and in the recompression stroke, the combustion gas is introduced into the decomposer through the port, and the residual gas is thereby pushed and accommodated in the additional space.

[13]

The method according to any one of [10] to [12], further comprising varying an internal volume of the additional space using a slider and according to an operating state of the reciprocating engine.

[14]

The method according to any one of [10] to [14], further comprising discharging the carbon from the additional space via a discharge passage.

[15]

The method according to any one of [10] to [14], wherein the decomposer is adjacent to an exhaust port of the reciprocating engine, the openable/closable port is adjacent to an exhaust port of the reciprocating engine, a total internal volume of the additional space is less than a total internal volume of the reforming space, and no portion of the additional space is adjacent to the connection portion of the decomposer with the openable/closable port.

[16]

The method according to any one of [10] to [16], wherein the additional space circumscribes a portion of a hydrogen permeable membrane forming part of a collector pipe extending into the decomposer from the opposite side opposite the connection portion.

[17]

A decomposer for a fuel reforming system for decomposing hydrocarbon fuel into carbon and hydrogen gas using heat and a pressure of combustion gas produced in a combustion chamber and a catalyst, the decomposer being in communication with the combustion chamber via an openable/closable port and comprising:

a case including:

an opening to receive an output from the openable/closable port, a reforming space adjacent to the opening and in which a reformer including the catalyst is on a side of a connection portion of the decomposer with the openable/closable port, an additional space on a side of the case opposite the opening to store residual gas that remains in the reforming space, wherein the additional space is adjacent to the reforming space such that no portion of the additional space is adjacent to the connection portion of the decomposer with the openable/closable port, and wherein a total internal volume of the additional space is less than a total internal volume of the reforming space.

[18]

The decomposer according to [17], further comprising a discharge passage coupled directly to the additional space to discharge the carbon separated from the decomposer.

[19]

The decomposer according to [17] or [18], further comprising:

a variable volume mechanism to vary a volume of the additional space, wherein the volume of the additional space is varied according to an operating state.

[20]

The decomposer according to any one of [17] to [19], wherein the reforming space and the additional space each circumscribe a collector pipe extending into the decomposer from the opposite side opposite the connection portion.

REFERENCE SIGNS LIST

1: fuel reforming system
2: control system
3: reciprocating engine
3*a*: combustion chamber
5: hydrogen gas supply section
6: decomposer
21: controller
22: rotational speed sensor
23: accelerator sensor
24: crank angle sensor
25: H2 sensor
27: spark plug
28: inverter
31: cylinder
32: piston
33: intake port
34: intake valve
35: exhaust port
36: exhaust valve
37: third port
38: on-off valve
41: intake valve train
42: exhaust valve train
43: third valve train
44: intake port injector
45: hydrocarbon fuel supply section
46: third port injector
47: hydrogen injector
61: case of the decomposer
61*a*: opening
62: reforming space
63: additional space
64: collector pipe
65: hydrogen permeable membrane
66: reforming member/reformer
66*a*: carrier
66*b*: catalyst
70: slide device (variable volume mechanism)
70*a*: slider
70*b*: drive device
80: carbon remover
81: discharge passage
82: collection box
83: control position
84: discharge position
Gr: residual gas
Gb: combustion gas

The invention claimed is:

1. A fuel reforming system for a vehicle, on which a reciprocating engine is mounted, wherein in the reciprocating engine, a combustion chamber where combustion occurs is partitioned inside a cylinder in which a piston reciprocates, the fuel reforming system comprising:

a decomposer that decomposes hydrocarbon fuel into carbon and hydrogen gas using heat and a pressure of combustion gas produced in the combustion chamber and a catalyst and holds the carbon; and a hydrocarbon fuel supply that supplies the hydrocarbon fuel to the decomposer, wherein the decomposer communicates with the combustion chamber via an openable/closable port, a reforming space in which a reformer including the catalyst is on a side of a connection portion of the decomposer with the openable/closable port, and on an opposite side of an interior of the connection portion of the decomposer with the port, an additional space is adjacent to the reforming space, wherein in the additional space, residual gas that remains in the port and the decomposer is accommodated under a condition where the combustion gas is introduced into the decomposer through the openable/closable port.

2. The fuel reforming system according to claim 1, further comprising:

a variable volume mechanism to vary a volume of the additional space, wherein the volume of the additional space is varied according to an operating state of the reciprocating engine.

3. The fuel reforming system according to claim 1, wherein the carbon is held in a separable state in the decomposer, and an openable/closable discharge passage is connected to the additional space and is configured to discharge the carbon separated from the decomposer.

4. The fuel reforming system according to claim 1, wherein the reciprocating engine is configured to perform a six-stroke cycle including:

an intake stroke in which at least intake air is introduced into the combustion chamber through an intake port by lowering the piston;

a compression stroke in which air-fuel mixture containing the hydrogen gas supplied to the combustion chamber is compressed by raising the piston;

an expansion stroke in which the piston is lowered by combustion of the air-fuel mixture;

a recompression stroke in which the combustion gas is compressed by raising the piston;

a re-expansion stroke in which the piston is lowered; and an exhaust stroke in which exhaust gas is discharged through an exhaust port by raising the piston, and in the recompression stroke, the combustion gas is introduced into the decomposer through the port, and the residual gas is thereby pushed and accommodated in the additional space.

5. The fuel reforming system according to claim 1, wherein the decomposer is adjacent to an exhaust port of the reciprocating engine.

6. The fuel reforming system according to claim 1, wherein the openable/closable port is adjacent to an exhaust port of the reciprocating engine.

7. The fuel reforming system according to claim 1, wherein a total internal volume of the additional space is less than a total internal volume of the reforming space, and no portion of the additional space is adjacent to the connection portion of the decomposer with the openable/closable port.

8. The fuel reforming system according to claim 1, wherein the reforming space and the additional space each circumscribe a collector pipe extending into the decomposer from the opposite side opposite the connection portion.

9. The fuel reforming system according to claim 1, wherein the additional space circumscribes a portion of a hydrogen permeable membrane.

10. A method regarding a fuel reforming system for a vehicle, on which a reciprocating engine is mounted, wherein in the reciprocating engine, a combustion chamber where combustion occurs is partitioned inside a cylinder in which a piston reciprocates, the method comprising:

providing a decomposer that decomposes hydrocarbon fuel into carbon and hydrogen gas using heat and a pressure of combustion gas produced in the combustion chamber and a catalyst and holds the carbon; and providing a hydrocarbon fuel supply that supplies the hydrocarbon fuel to the decomposer, wherein the decomposer communicates with the combustion chamber via an openable/closable port, a reforming space in which a reformer including the catalyst is on a side of a connection portion of the decomposer with the openable/closable port, and on an opposite side of an interior of the connection portion of the decomposer with the port, an additional space is adjacent to the reforming space, wherein in the additional space, residual gas that remains in the decomposer is accommodated under a condition where the combustion gas is introduced into the decomposer through the openable/closable port.

11. The method according to claim 10, further comprising:

decomposing, using the decomposer, the hydrocarbon fuel into the carbon and the hydrogen gas using the heat and the pressure of combustion gas produced in the combustion chamber and the catalyst; and holding the carbon.

12. The method according to claim 10, further comprising performing a six-stroke cycle including:

an intake stroke in which at least intake air is introduced into the combustion chamber through an intake port by lowering the piston;

a compression stroke in which air-fuel mixture containing the hydrogen gas supplied to the combustion chamber is compressed by raising the piston;

an expansion stroke in which the piston is lowered by combustion of the air-fuel mixture;

a recompression stroke in which the combustion gas is compressed by raising the piston;

a re-expansion stroke in which the piston is lowered; and an exhaust stroke in which exhaust gas is discharged through an exhaust port by raising the piston, and in the recompression stroke, the combustion gas is introduced into the decomposer through the port, and the residual gas is thereby pushed and accommodated in the additional space.

13. The method according to claim 10, further comprising varying an internal volume of the additional space using a slider and according to an operating state of the reciprocating engine.

14. The method according to claim 10, further comprising discharging the carbon from the additional space via a discharge passage.

15. The method according to claim 10, wherein the decomposer is adjacent to an exhaust port of the reciprocating engine, the openable/closable port is adjacent to the exhaust port of the reciprocating engine, a total internal volume of the additional space is less than a total internal volume of the reforming space, and no portion of the additional space is adjacent to the connection portion of the decomposer with the openable/closable port.

16. The method according to claim 10, wherein the additional space circumscribes a portion of a hydrogen permeable membrane forming part of a collector pipe extending into the decomposer from the opposite side opposite the connection portion.

17. A decomposer for a fuel reforming system for decomposing hydrocarbon fuel into carbon and hydrogen gas using heat and a pressure of combustion gas produced in a combustion chamber and a catalyst, the decomposer being in communication with the combustion chamber via an openable/closable port and comprising:

a case including:

an opening to receive an output from the openable/closable port, a reforming space adjacent to the opening and in which a reformer including the catalyst is on a side of a connection portion of the decomposer with the openable/closable port, an additional space on a side of the case opposite the opening to store residual gas that remains in the reforming space, wherein the additional space is adjacent to the reforming space such that no portion of the additional space is adjacent to the connection portion of the decomposer with the openable/closable port, and wherein a total internal volume of the additional space is less than a total internal volume of the reforming space.

18. The decomposer according to claim 17, further comprising a discharge passage coupled directly to the additional space to discharge the carbon separated from the decomposer.

19. The decomposer according to claim 17, further comprising:

a variable volume mechanism to vary a volume of the additional space, wherein the volume of the additional space is varied according to an operating state.

20. The decomposer according to claim 17, wherein the reforming space and the additional space each circumscribe a collector pipe extending into the decomposer from the opposite side opposite the connection portion.

* * * * *